United States Patent
Baba et al.

(10) Patent No.: US 9,928,429 B2
(45) Date of Patent: Mar. 27, 2018

(54) IMAGE PROCESSING APPARATUS AND IMAGE PROCESSING METHOD

(71) Applicant: FUJITSU LIMITED, Kawasaki-shi, Kanagawa (JP)

(72) Inventors: Kozo Baba, Oita (JP); Norio Hashiguchi, Yokohama (JP); Syoji Kita, Soka (JP); Kunikazu Takahashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 146 days.

(21) Appl. No.: 14/685,668

(22) Filed: Apr. 14, 2015

(65) Prior Publication Data

US 2015/0220794 A1    Aug. 6, 2015

Related U.S. Application Data

(63) Continuation of application No. PCT/JP2012/076858, filed on Oct. 17, 2012.

(51) Int. Cl.
*G06T 7/00* (2017.01)
*G06K 9/00* (2006.01)
(Continued)

(52) U.S. Cl.
CPC ....... *G06K 9/00805* (2013.01); *G06K 9/4647* (2013.01); *G06K 9/6212* (2013.01);
(Continued)

(58) Field of Classification Search
CPC ............. G06K 9/00805; G06K 9/4647; G06K 9/6212; G06T 7/004; G06T 7/2053
See application file for complete search history.

(56) References Cited

U.S. PATENT DOCUMENTS 6,477,260 B1 * 11/2002 Shimomura ............ G06T 7/593
340/435
6,990,216 B2 * 1/2006 Yamamura ......... B60K 31/0008
382/104
(Continued)

FOREIGN PATENT DOCUMENTS

| JP | 04-311187 | 11/1992 |
|---|---|---|
| JP | 2005-339152 | 12/2005 |

(Continued)

OTHER PUBLICATIONS

Jung, Boyoon. Sukhatme, Gauray. "Detecting Moving Objects using a Single Camera on a Mobile Robot in an Outdoor Environment." 8th Conference on Intelligent Autonomous Systems. 2004.*

(Continued)

*Primary Examiner* — Kim Vu
*Assistant Examiner* — Molly Delaney
(74) *Attorney, Agent, or Firm* — Fujitsu Patent Center

(57) ABSTRACT

An image processing apparatus includes a calculating unit and a detecting unit. The calculating unit calculates an additional value of a luminance values for each coordinate value in a first direction. The calculating unit calculates an additional value of the luminance values for each coordinate value in a second direction. The detecting unit detects a region of the image in which additional values of the luminance values for each coordinate value in the first direction are equal or a region in which additional values of the luminance values for each coordinate value in the second direction are equal.

7 Claims, 21 Drawing Sheets

(51) Int. Cl.
*G06K 9/46* (2006.01)
*G06K 9/62* (2006.01)
*G06T 7/70* (2017.01)
*G06T 7/254* (2017.01)

(52) U.S. Cl.
CPC ................ *G06T 7/254* (2017.01); *G06T 7/70* (2017.01); *G06T 2207/10016* (2013.01); *G06T 2207/20061* (2013.01); *G06T 2207/30261* (2013.01)

(56) References Cited

U.S. PATENT DOCUMENTS

| | | | |
|---|---|---|---|
| 7,106,886 B2* | 9/2006 | Shimakage | G06K 9/00798 382/104 |
| 7,619,649 B2* | 11/2009 | Kogure | G06T 7/0002 348/148 |
| 7,663,475 B2* | 2/2010 | Kudo | B60Q 9/008 340/435 |
| 2006/0115122 A1* | 6/2006 | Nagaoka | G06K 9/3241 382/104 |
| 2007/0052840 A1* | 3/2007 | Okuno | H04N 5/2351 348/364 |
| 2014/0092237 A1* | 4/2014 | Watanabe | B60R 1/00 348/118 |
| 2014/0168440 A1* | 6/2014 | Tsuchiya | B60R 1/00 348/148 |
| 2014/0368656 A1* | 12/2014 | Hayakawa | G08G 1/167 348/148 |
| 2015/0154460 A1* | 6/2015 | Baba | G06K 9/00805 382/104 |
| 2015/0324972 A1* | 11/2015 | Hayakawa | H04N 7/183 348/148 |

FOREIGN PATENT DOCUMENTS

| | | |
|---|---|---|
| JP | 2006-309445 | 11/2006 |
| JP | 2009-122753 | 6/2009 |
| JP | 2011-100298 | 5/2011 |

OTHER PUBLICATIONS

Chinese Office Action dated Aug. 1, 2016 for corresponding Chinese Patent Application No. 201280076395.2, with English Translation, 15 pages.
International Search Report and Written Opinion of the International Searching Authority (Form PCT/ISA/210, Form PCT/ISA/237), mailed in connection with PCT/JP2012/076858 and dated Dec. 25, 2012 (9 pages). Partial Translation.
Japanese Office Action dated May 10, 2016 for corresponding Japanese Patent Application No. 2014-541868, with Partial English Translation, 4 pages.
Office Action dated Mar. 3, 2017 for corresponding Chinese Patent Application No. 201280076395.2, with English Translation, 25 pages. *

* cited by examiner

FIG.3

| FRAME NUMBER | DATE AND TIME | SPEED | ... | ACCELERATION | POSITION COORDINATES | IMAGE |
|---|---|---|---|---|---|---|
| N-1 | DATE AND TIME XN-1 | SPEED AN-1 | | ACCELERATION BN-1 | xn-1, yn-1 | IMAGE DATA IN FRAME N-1 |
| N | DATE AND TIME XN | SPEED AN | | ACCELERATION BN | xn, yn | IMAGE DATA IN FRAME N |
| N+1 | DATE AND TIME XN+1 | SPEED AN+1 | | ACCELERATION BN+1 | xn+1, yn+1 | IMAGE DATA IN FRAME N+1 |
| | | | ... | | | |

| FRAME NUMBER | MOVING OBJECT IDENTIFICATION NUMBER | DETECTION COORDINATES | RELIABILITY | MOVING OBJECT IDENTIFICATION NUMBER | DETECTION COORDINATES | RELIABILITY | ... |
|---|---|---|---|---|---|---|---|
| M-1 | A1001 | (xa1, ya1) | 70 | A1002 | (xa2, ya2) | 50 | |
| M | A1003 | (xa3, ya3) | 70 | A1004 | (xa4, ya4) | 50 | |
| M+1 | A1005 | (xa5, ya5) | 70 | A1006 | (xa6, ya6) | 50 | |

142b

| FRAME NUMBER | MOVING OBJECT IDENTIFICATION NUMBER | DETECTION COORDINATES | RELIABILITY | MOVING OBJECT IDENTIFICATION NUMBER | DETECTION COORDINATES | RELIABILITY | ... |
|---|---|---|---|---|---|---|---|
| M-1 | B1001 | (xb1, yb1) | 70 | B1002 | (xb2, yb2) | 50 | |
| M | B1003 | (xb3, yb3) | 70 | B1004 | (xb4, yb4) | 50 | |
| M+1 | B1005 | (xb5, yb5) | 70 | B1006 | (xb6, yb6) | 50 | |

142c

| FRAME NUMBER | MOVING OBJECT IDENTIFICATION NUMBER | DETECTION COORDINATES | RELIABILITY | MOVING OBJECT IDENTIFICATION NUMBER | DETECTION COORDINATES | RELIABILITY | ... |
|---|---|---|---|---|---|---|---|
| M-1 | C1001 | (xc1, yc1) | 70 | C1002 | (xc2, yc2) | 50 | |
| M | C1003 | (xc3, yc3) | 70 | C1004 | (xc4, yc4) | 50 | |
| M+1 | C1005 | (xc5, yc5) | 70 | C1006 | (xc6, yc6) | 50 | |

| INTEGRATION IDENTIFICATION NUMBER | MOVING OBJECT IDENTIFICATION NUMBER GROUP |
|---|---|
| DD1001 | B1001, B1002, ⋯, C1001, ⋯, A1001, A1002, A1003, ⋯ |
| ⋯ | |

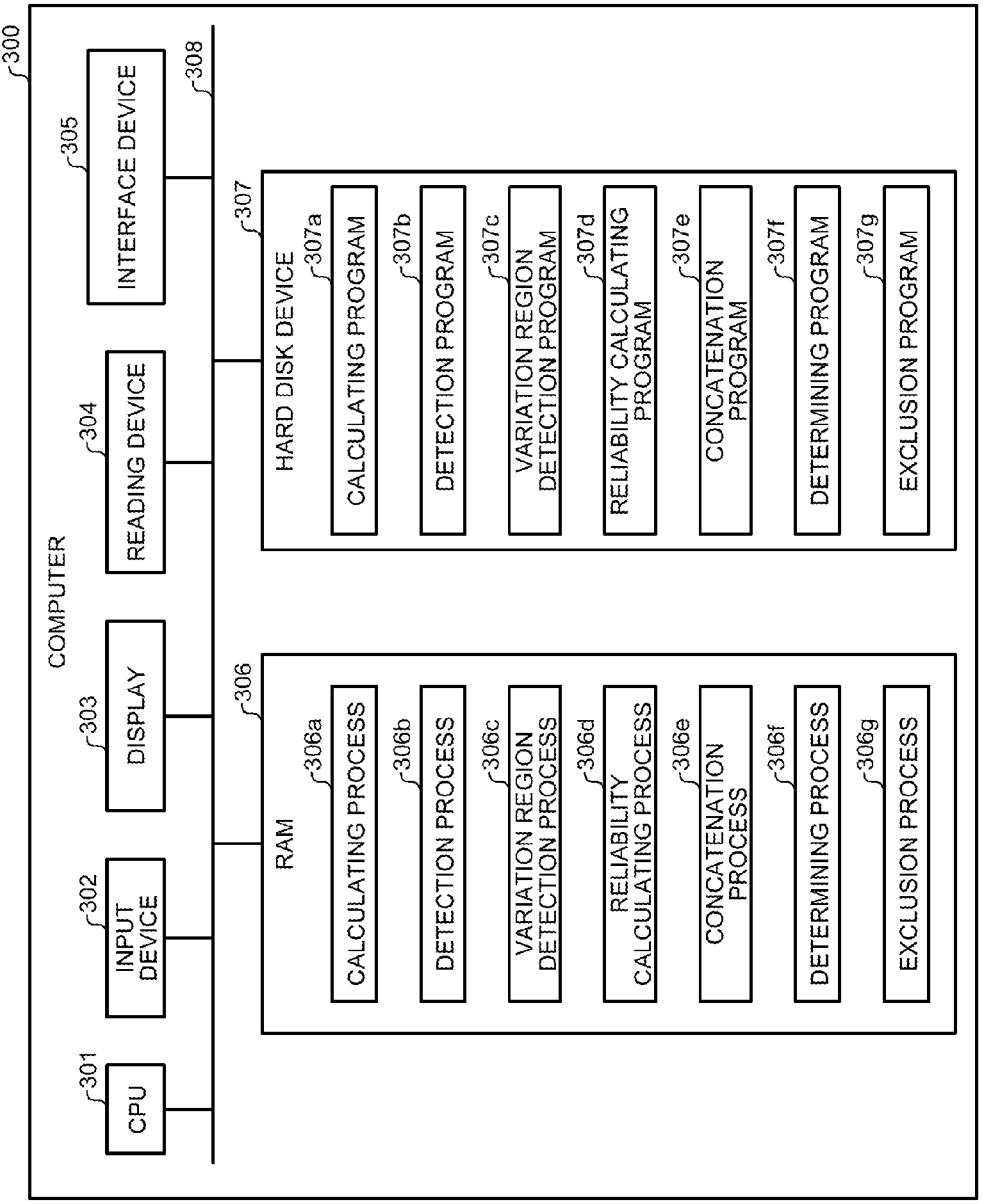

IMAGE PROCESSING APPARATUS AND IMAGE PROCESSING METHOD

CROSS-REFERENCE TO RELATED APPLICATION(S)

This application is a continuation of International Application No. PCT/JP2012/076858, filed on Oct. 17, 2012, the entire contents of which are incorporated herein by reference.

FIELD

The embodiments discussed herein are directed to an image processing apparatus or the like.

BACKGROUND

If it is possible to notify a driver of information on a potentially dangerous location where an event of a near miss, such as a vehicle accidentally contacts with a pedestrian who is crossing a road, that gives a driver a shock or a scary tends to occur, the occurrence of an accident can be prevented. In order to specify information on the location where an event of a near miss tends to occur, data recorded in a drive recorder can be used. For example, in the drive recorder, the location of a vehicle, the capturing date and time, the acceleration of a vehicle, the speed of the vehicle, image data on the front of the vehicle, or the like are recorded.

For example, there is a conventional technology that statistically performs a process on image data recorded in a drive recorder, analyzes a hazardous event or a risk factor for each dangerous location, and outputs advice to a driver on the basis of the analysis results.

Patent Literature 1: Japanese Laid-open Patent Publication No. 2006-309445

Patent Literature 2: Japanese Laid-open Patent Publication No. 2011-100298

Accordingly, it is an object in one aspect of an embodiment of the invention to provide an image processing apparatus that can accurately detect a moving object, an image processing program, and an image processing method.

SUMMARY

According to an aspect of an embodiment, an image processing apparatus includes a processor that executes a process including summing a plurality of luminance values of a coordinate value in a direction included in a processing target region in an image to generate a first additional value of the luminance values for each coordinate value in the direction; detecting a first region of the image in which each of the first additional values is larger than a reference value based on a result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a schematic diagram illustrating an example of the data structure of drive recorder information.

FIG. 4 is a schematic diagram illustrating an example of the data structure of a moving object management table.

FIG. 26 is a block diagram illustrating an example of a computer that executes an image processing program.

DESCRIPTION OF EMBODIMENTS

However, with the conventional technology described above, there is a problem in that it is not able to accurately detect a moving object.

For example, the resolution of the image data recorded in the drive recorder is originally rough and, furthermore, the data is compressed in order to reduce its size. Furthermore, even if the moving object resulting in a near miss is limited to a vehicle, there are various shapes, such as a passenger car, a large-sized vehicle, a truck, a motorcycle, or the like. Furthermore, the shape of the detection target on an image varies due to the positional relationship between the own vehicle and the detection target. Consequently, it is difficult to accurately detect, from the image data recorded in the drive recorder or the like, a moving object that may cause a near miss.

Preferred embodiments of an image processing apparatus, an image processing program, and an image processing method according to the present invention disclosed in the present invention will be described in detail below with reference to the accompanying drawings. The present invention is not limited to the embodiments.

First Embodiment

Figure 1:
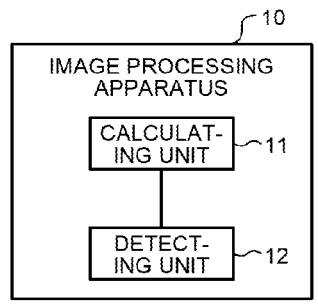
FIG. 1 is a functional block diagram illustrating the configuration of an image processing apparatus according to a first embodiment.

The configuration of an image processing apparatus according to a first embodiment will be described. FIG. 1 is a functional block diagram illustrating the configuration of an image processing apparatus according to a first embodiment. As illustrated in FIG. 1, an image processing apparatus 10 includes a calculating unit 11 and a detecting unit 12.

The calculating unit 11 adds, for each coordinate value in the first direction included in a processing target region in an image, luminance values of the same coordinate value and calculates an additional value of the luminance values for each coordinate value in the first direction. Alternatively, the calculating unit 11 adds, for each coordinate value of the luminance value in the second direction included in the processing target region, the luminance values of the same coordinate value and calculates an additional value of the luminance values for each coordinate value in the second direction.

The detecting unit 12 detects, on the basis of the results calculated by the calculating unit 11, a region in the image in which the additional values of the luminance values for each coordinate value in the first direction are equal or a region in the image in which the additional values of the luminance values for each coordinate value in the second direction are equal.

The effect of the image processing apparatus 10 according to the first embodiment will be described. For example, when the image processing apparatus 10 performs a process on image data recorded in a drive recorder, most of the image in the processing target region corresponds to a road surface. If a moving object is present on this road surface, there is a luminance difference between the image of the moving object and the image of the road surface. Consequently, as described above, by detecting a region of an image in which the additional values of the luminance values for each coordinate value in the first direction or the second direction are equal, it is possible to accurately detect a moving object.

Second Embodiment

Figure 2:
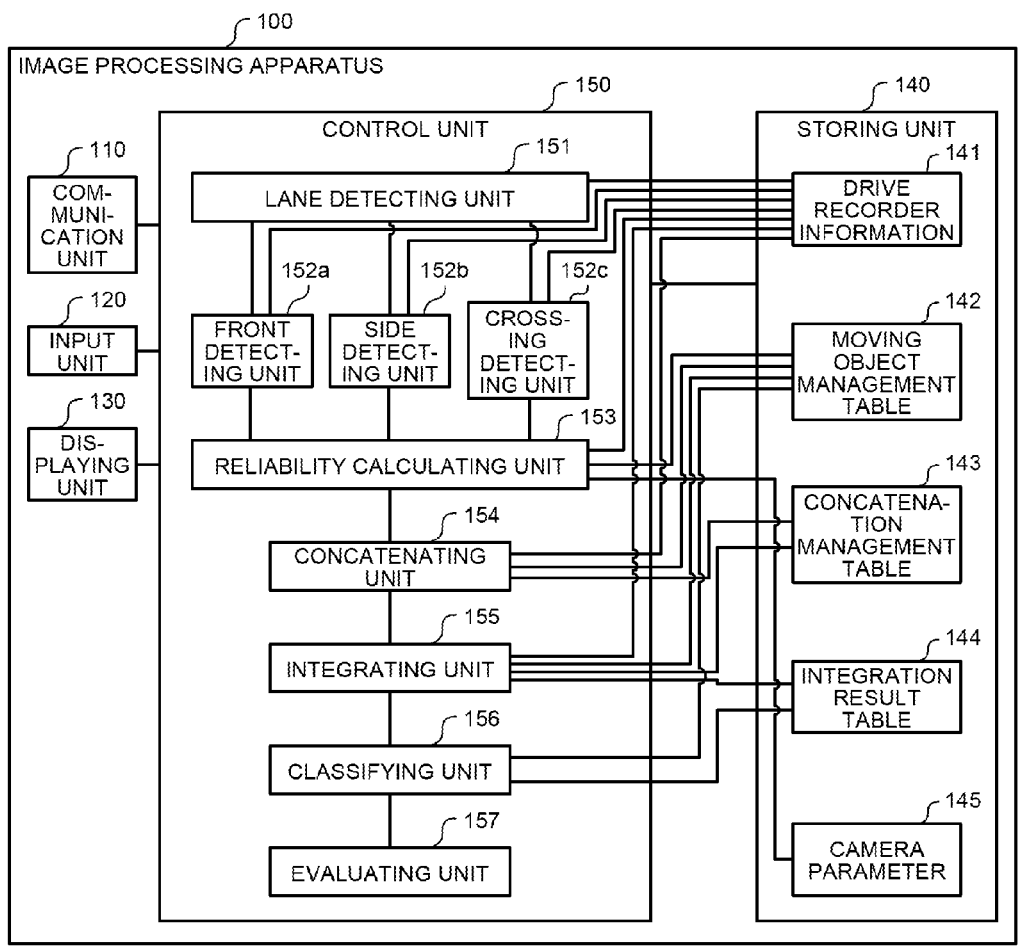
FIG. 2 a functional block diagram illustrating the configuration of an image processing apparatus according to a second embodiment.

In the following, an image processing apparatus according to a second embodiment will be described. FIG. 2 a functional block diagram illustrating the configuration of an image processing apparatus according to a second embodiment. As illustrated in FIG. 2, an image processing apparatus 100 includes a communication unit 110, an input unit 120, a displaying unit 130, a storing unit 140, and a control unit 150.

The communication unit 110 is a processing unit that performs data communication with another device via a network. The communication unit 110 corresponds to, for example, a communication device or the like.

The input unit 120 is an input device that inputs various kinds of data to the image processing apparatus 100. For example, the input unit 120 corresponds to a keyboard, a mouse, a touch panel, or the like. The displaying unit 130 is a display device that displays data output from the control unit 150. For example, the displaying unit 130 corresponds to a liquid crystal display, a touch panel, or the like.

The storing unit 140 includes a drive recorder information 141, a moving object management table 142, a concatenation management table 143, an integration result table 144, and a camera parameter 145. The storing unit 140 corresponds to a semiconductor memory device, such as a random access memory (RAM), a read only memory (ROM), a flash memory, or the like, or a storage device, such as a hard disk, an optical disk, or the like.

The drive recorder information 141 includes various kinds of data recorded by a drive recorder. FIG. 3 is a schematic diagram illustrating an example of the data structure of drive recorder information. As illustrated in FIG. 3, the drive recorder information 141 stores therein, in an associated manner, a frame number, the date and time, the speed, the acceleration, the position coordinates, and an image. The frame number is the number for uniquely identifying a frame. The date and time is date and time at which a subject frame is imaged. The speed is a speed of a vehicle having mounted thereon a drive recorder obtained at the time of imaging the subject frame. The acceleration is an acceleration of a vehicle having mounted thereon a drive recorder obtained at the time of imaging the subject frame. The position coordinates are the position coordinates of a vehicle having mounted thereon a drive recorder obtained at the time of imaging the subject frame. Furthermore, the image is image data in a subject frame.

The moving object management table 142 is a table that includes therein information on a moving object detected from each frame. FIG. 4 is a schematic diagram illustrating an example of the data structure of a moving object management table. For example, the moving object management table 142 includes tables 142a, 142b, and 142c.

The table 142a holds information on a moving object in a front region detected by a front detecting unit 152a. A description of the front region will be given later. The table 142a includes therein a frame number, a moving object identification number, the detection coordinates, and the reliability. The frame number is the number that is used to uniquely identify a frame. The moving object identification number is information for uniquely identifying a moving object. The detection coordinates indicates the coordinates of the region in which a moving object has been detected. The reliability is the value indicating the degree of accuracy whether the detected moving object is a moving object. As the reliability is increased, the degree of accuracy of the moving object is increased. If multiple moving objects are detected in a front region in the same frame, multiple combinations of the moving object identification number, the detection coordinates, and the reliability are present in the records in the same frame number.

The table 142b holds information on a moving object in a side region detected by a side detecting unit 152b. A description of the side region will be given later. The table 142b includes therein a frame number, a moving object identification number, the detection coordinates, and the reliability. Descriptions of the frame number, the moving object identification number, the detection coordinates, and the reliability are the same as those given for the table 142a. If multiple moving objects are detected in the side region in the same frame, multiple combinations of the moving object identification number, the detection coordinates, and the reliability are present in the records in the same frame number.

The table 142c holds information on a moving object in a crossing region detected by a crossing detecting unit 152c. A description of the crossing region will be given later. The table 142c includes therein a frame number, a moving object identification number, the detection coordinates, and the reliability. If multiple moving objects are detected in the crossing region in the same frame, multiple combinations of the moving object identification number, the detection coordinates, and the reliability are present in the records in the same frame number.

Figures 5A, 5B:
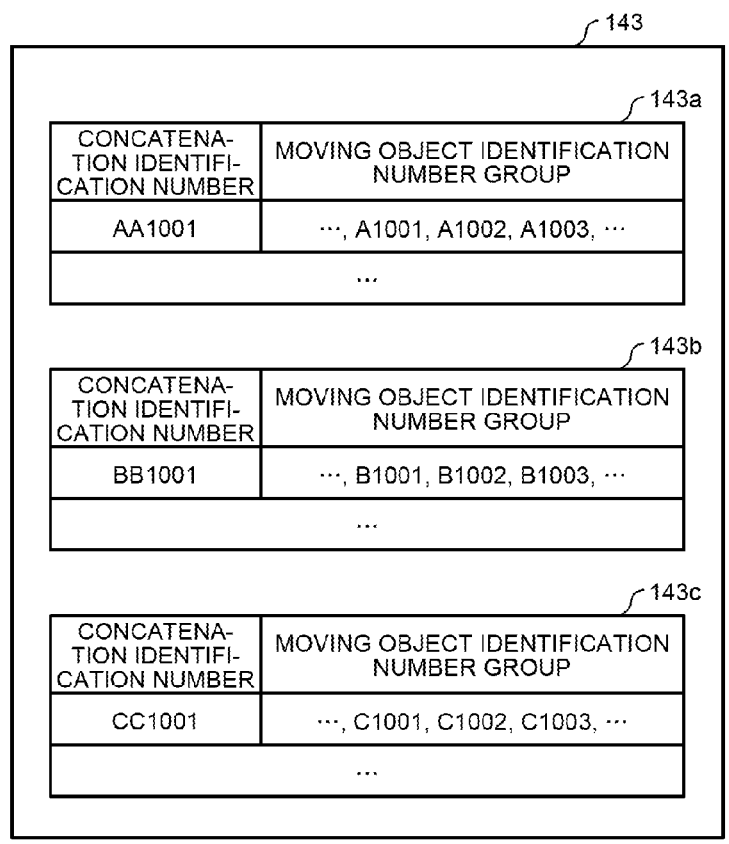
FIG. 5A is a schematic diagram illustrating an example of the data structure of a concatenation management table.
FIG. 5B is a schematic diagram illustrating an example of the data structure of an integration result table.

The concatenation management table 143 is a table that includes therein information on the result of concatenation of each of the moving objects detected from each of the frames. A description of a process of concatenating the moving objects will be described later. FIG. 5A is a schematic diagram illustrating an example of the data structure of a concatenation management table. For example, the concatenation management table 143 includes tables 143a, 143b, and 143c.

The table 143a is a table that includes therein information on the results of concatenating the moving objects in the front region detected by the front detecting unit 152a. For example, the table 143a includes therein a concatenation identification number and a moving object identification number group. The concatenation identification number is information for uniquely identifying a group of concatenated moving objects. The moving object identification number group is information that indicates each of the moving object identification numbers of the concatenated moving objects.

The table 143b is a table that includes therein information on the results of concatenating the moving objects in the side region detected by the side detecting unit 152b. For example, the table 143b includes therein a concatenation identification number and a moving object identification number group. Descriptions of the concatenation identification number and the moving object identification number group are the same as those of the concatenation identification number and the moving object identification number group, respectively, included in the table 143a.

The table 143c is a table that includes information on the results of concatenating the moving objects in the crossing region detected by the crossing detecting unit 152c. For example, the table 143c includes a concatenation identification number and a moving object identification number group. Descriptions of the concatenation identification number and the moving object identification number group are the same as those of the concatenation identification number and the moving object identification number group, respectively, included in the table 143a.

The integration result table 144 is a table that stores therein information on the results of concatenating the moving objects detected in a front region F, a side region S, and a crossing region C. FIG. 5B is a schematic diagram illustrating an example of the data structure of an integration result table. As illustrated in FIG. 5B, the integration result table 144 includes an integration identification number and a moving object identification number group. The integration identification number is information for uniquely identifying a group of concatenated moving objects. The moving object identification number group is information that indicates each of the moving object identification numbers of the concatenated moving objects.

The camera parameter 145 includes information on various parameters of a camera used by a drive recorder. For example, the camera parameter 145 includes the horizontal angle of view for a camera, the vertical angle of view, the horizontal resolution of a frame, the vertical resolution of the frame, and the installation height of the camera.

The control unit 150 includes a lane detecting unit 151, the front detecting unit 152a, the side detecting unit 152b, the crossing detecting unit 152c, a reliability calculating unit 153, a concatenating unit 154, an integrating unit 155, a classifying unit 156, and an evaluating unit 157. The control unit 150 corresponds to, for example, an integrated circuit, such as an application specific integrated circuit (ASIC), a field programmable gate array (FPGA), or the like. Furthermore, the control unit 150 corresponds to, for example, an electronic circuit, such as a CPU, a micro processing unit (MPU), or the like.

The lane detecting unit 151 is a processing unit that acquires image data in each frame from the drive recorder information 141 and that detects a lane region in the image. In a description below, a lane region in an image is referred to as a lane region.

Figure 6:
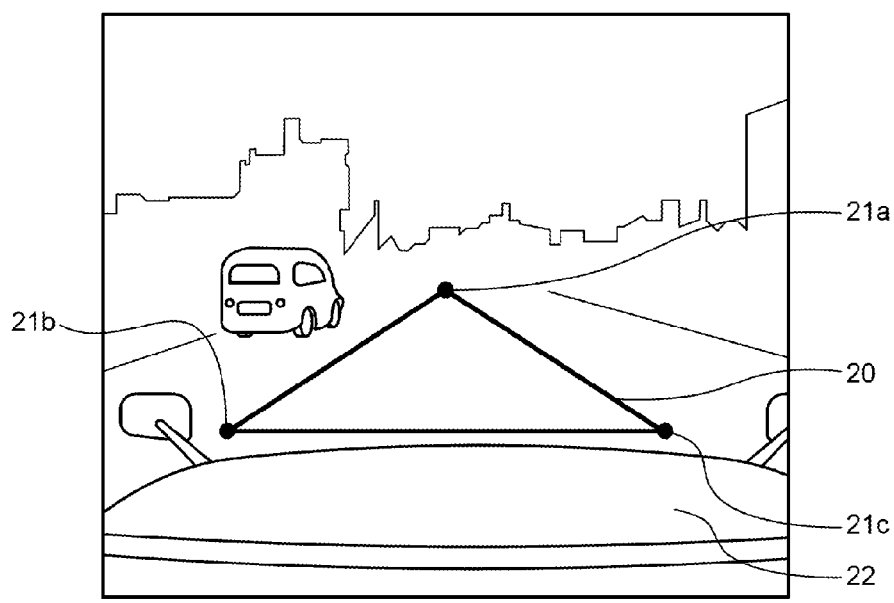
FIG. 6 is a schematic diagram illustrating an example of a lane region detected by a lane detecting unit.

FIG. 6 is a schematic diagram illustrating an example of a lane region detected by a lane detecting unit. As illustrated in FIG. 6, a lane region 20 is the triangle region that has points 21a, 21b, and 21c as vertices. The point 21a is a point associated with a vanishing point.

A description will be given of an example of a process in which the lane detecting unit 151 detects a vanishing point. The lane detecting unit 151 detects a plurality of straight lines by performing the Hough transform on image data and then specifies the point in which the straight lines intersect with each other as a vanishing point. The lane detecting unit 151 may also specify a vanishing point by using any other conventional technology.

The points 21b and 21c illustrated in FIG. 6 are the points that are set at the position above a hood 22 of the vehicle. The position of the hood 22 may also be previously set or may also be specified by predetermined image processing.

The lane detecting unit 151 detects the lane region 20 by specifying the points 21a, 21b, and 21c and by obtaining the triangle region that has the points 21a, 21b, and 21c as vertices. The lane detecting unit 151 outputs information on a vehicle region to the front detecting unit 152a, the side detecting unit 152b, and the crossing detecting unit 152c.

The front detecting unit 152a is a processing unit that detects a moving object included in a front region. The side detecting unit 152b is a processing unit that detects a moving object included in a side region. A crossing detecting unit 152c is a processing unit that detects a moving object included in a crossing region.

Figure 7:
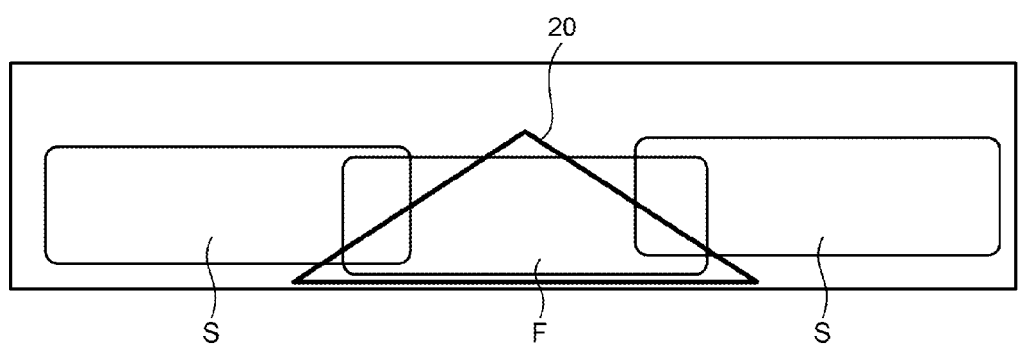
FIG. 7 is a schematic diagram illustrating a front region and a side region.

FIG. 7 is a schematic diagram illustrating a front region and a side region. As illustrated in FIG. 7, a front region F is a rectangular region that includes the lane region 20. Side regions S are rectangular regions that overlap with a part of the front region F and that include both sides of the lane region 20.

Figure 8:
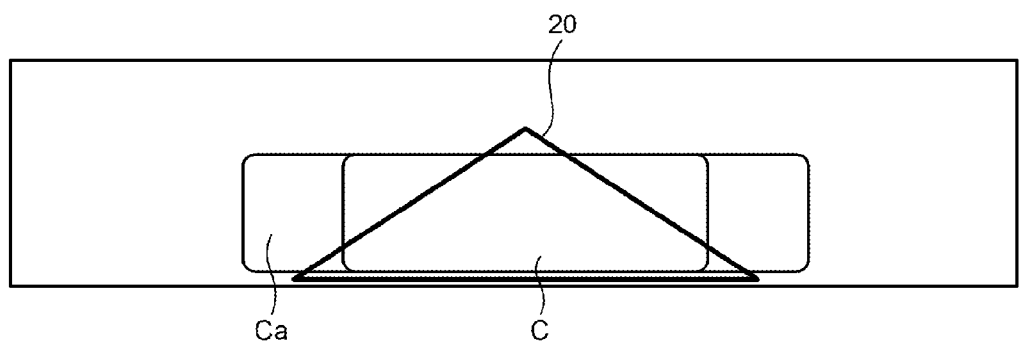
FIG. 8 is a schematic diagram illustrating a crossing region.

FIG. 8 is a schematic diagram illustrating a crossing region. The size of the crossing region varies depending on a speed. If a speed is not zero, a crossing region C is obtained. The crossing region C includes the front region F and a part of the side regions S illustrated in FIG. 7. If a speed is zero, the crossing region becomes a crossing region Ca. For example, the crossing region Ca becomes a region greater than that of the crossing region C.

Figure 9:
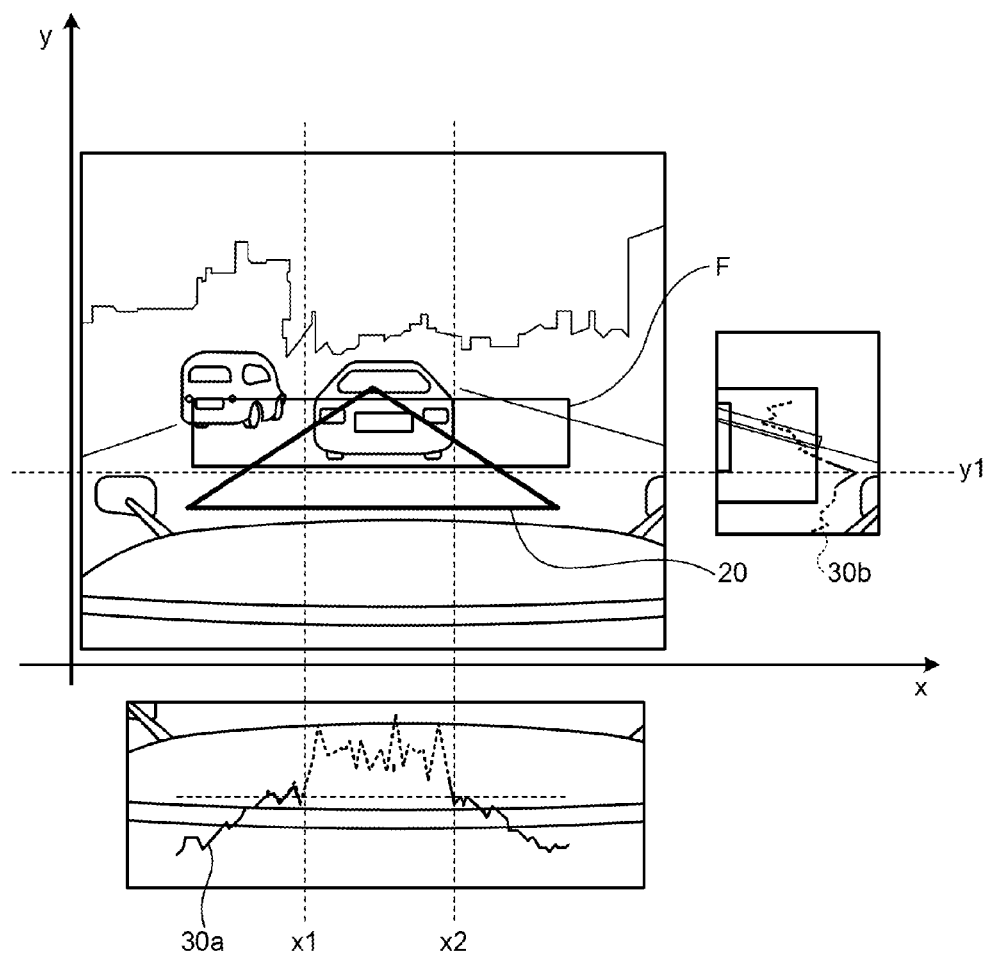
FIG. 9 is a schematic diagram illustrating a process performed by a front detecting unit.

A description will be given of an example of a process in which the front detecting unit 152a detects a moving object included in the front region F. The front detecting unit 152a acquires image data in each frame from the drive recorder information 141. FIG. 9 is a schematic diagram illustrating a process performed by a front detecting unit. In FIG. 9, the horizontal axis indicates the x coordinate and the vertical axis indicates the y coordinate.

The front detecting unit 152a calculates a luminance projection value in the vertical direction with respect to the front region F. The front detecting unit 152a calculates a luminance projection value 30a in the vertical direction by adding, for each x coordinate value in the vertical direction, luminance values of the same x coordinate value included in the front region F. The front detecting unit 152a detects the range between x1 and x2, in the x coordinate, in which additional values of luminance values are equal.

The front detecting unit 152a detects x1 and x2 by calculating the x coordinate in which the difference between the luminance values in the adjacent x coordinates is equal to or greater than a threshold. For example, the front detecting unit 152a calculates the average of the luminance values in the x coordinates included in the luminance projection value 30a and uses the calculated average of the luminance values as a threshold.

For example, because, the luminance of a white color tone vehicle is higher than that of a road surface, a difference between the luminance value and the threshold becomes great in the range of the x coordinates in which the vehicle is included. Furthermore, because the luminance of a black color tone vehicle is lower than that of a road surface, a difference between the luminance value and the threshold becomes great in the range of the x coordinates in which the vehicle is included.

Then, the front detecting unit 152a calculates a luminance projection value in the lateral direction. The front detecting unit 152a calculates a luminance projection value 30b in the lateral direction by adding, for each y coordinate value in the lateral direction, luminance values of the same y coordinate value included in the front region F.

On the basis of the luminance projection value 30b in the lateral direction, the front detecting unit 152a detects the y coordinate in which the luminance value becomes the minimum as y1.

The front detecting unit 152a specifies the midpoint between x1 and x2 as the x coordinate of the moving object. Furthermore, the front detecting unit 152a specifies y1 as the y coordinate of the moving object. For example, the front detecting unit 152a outputs information on the coordinates on the moving object, information on the lane region, and information on the range of the moving object in the x coordinates to the reliability calculating unit 153.

However, the process in which the front detecting unit 152a obtains the range between x1 and x2 in the x coordinates that includes the moving object is not limited to the process described above. For example, the front detecting unit 152a may also specify a region, in which luminance projection values in the vertical direction are equal to or greater than the threshold, as a region that includes the moving object.

A description will be given of an example of a process in which the side detecting unit 152b detects a moving object included in the side region S. The side detecting unit 152b acquires image data in each frame from the drive recorder information 141. The process in which the side detecting unit 152b detects a moving object included in the side region S is the same as the process in which the front detecting unit 152a detects a moving object in the front region F.

Figure 10:
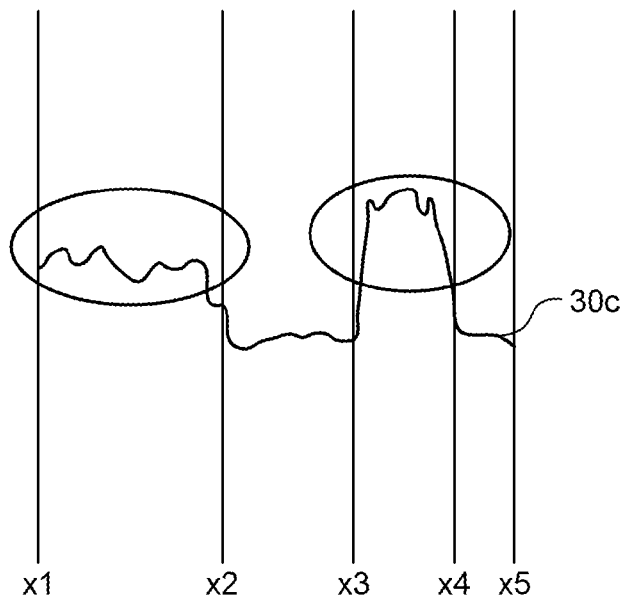
FIG. 10 is a schematic diagram illustrating a process performed by a side detecting unit.

For a luminance projection value in the vertical direction, if the range in which the additional values of the luminance values are equal comes into contact with outside the side region S, the side detecting unit 152b excludes the subject range from the range of the moving object. FIG. 10 is a schematic diagram illustrating a process performed by a side detecting unit. In FIG. 10, a luminance projection value 30c indicates luminance projection values in the vertical direction in the side region S, x1 indicates the x coordinate on the left end of the side region S, and x5 indicates the x coordinate on the right end of the side region S.

As illustrated in FIG. 10, for the luminance projection value 30c, the range of the x coordinates in which the additional values of luminance values are equal is the range between x1 and x2 and the range between x3 and x4. Here, the range between x1 and x2 comes into contact with the outer periphery of the side region S. Accordingly, the side detecting unit 152b excludes the range between x1 and x2 from the region of the moving object and specifies, for example, a range between x3 and x4 as the region of the moving object.

For example, the side detecting unit 152b outputs information on the coordinates of a moving object, information on a lane region, and information on the range of the moving object in the x coordinate to the reliability calculating unit 153.

A description will be given of an example of a process in which the crossing detecting unit 152c detects a moving object included in a crossing regions C and Ca. On the basis of the speed associated with the image data in the drive recorder information 141, if a speed is not zero, the crossing detecting unit 152c detects a moving object from the crossing region C. If a speed is zero, the crossing detecting unit 152c detects a moving object from the crossing region Ca.

The crossing detecting unit 152c sequentially performs a process of creating an average image, a process of creating a binary image, and a process of detecting a moving object.

A process in which the crossing detecting unit 152c creates an average image will be described. The crossing detecting unit 152c acquires image data in each frame in the drive recorder information 141 and adds each of the pixel values for each pixel. The crossing detecting unit 152c creates an average image by dividing the added pixel value for each pixel by the number of frames. Furthermore, the process in which the crossing detecting unit 152c creates an average image is not limited to the above described process. Any known method may also be used.

A process in which the crossing detecting unit 152c creates a binary image will be described. The crossing detecting unit 152c creates, for each frame, a difference image between an average image in each frame and image data in a frame. The crossing detecting unit 152c creates a binary image on the basis of each of the difference images.

For example, the crossing detecting unit 152c creates a difference image by subtracting a pixel value of each pixel in the average image from a pixel value of each pixel in the image data. The crossing detecting unit 152c may also create a difference image with respect to all frames.

The crossing detecting unit 152c decomposes the difference image into red, green, and blue (RGB). After the RGB decomposition, for each of the pixels in a difference image, if each of the value of R, the value of G, and the value of B exceeds a predetermined threshold, the crossing detecting unit 152c creates a binary image by setting the pixel value of the subject pixel to "1" and by setting the pixel value of the other pixels to "0". The crossing detecting unit 152c creates a binary image for each difference image.

A process in which the crossing detecting unit 152c detects a moving object will be described. When the crossing detecting unit 152c detects a moving object, the crossing detecting unit 152c performs a labeling process and a corner determination process.

The labeling process performed by the crossing detecting unit 152c will be described. The crossing detecting unit 152c scans a binary image and performs the labeling process that concatenates the pixels in which the pixel values are continuously "1". In a description below, the region concatenated by the labeling process is referred to as a candidate region. After the crossing detecting unit 152c detects a candidate region, the crossing detecting unit 152c performs area checking, filling ratio checking, and aspect ratio checking and excludes a candidate region that does not corresponds to a detection target.

The area checking performed by the crossing detecting unit 152c will be described. If the area of the candidate region is equal to or greater than a predetermined area that is previously set, the crossing detecting unit 152c leaves the subject candidate region. In contrast, if the area of the candidate region is less than the predetermined area that is previously set, the crossing detecting unit 152c excludes the subject candidate region.

Figure 11:
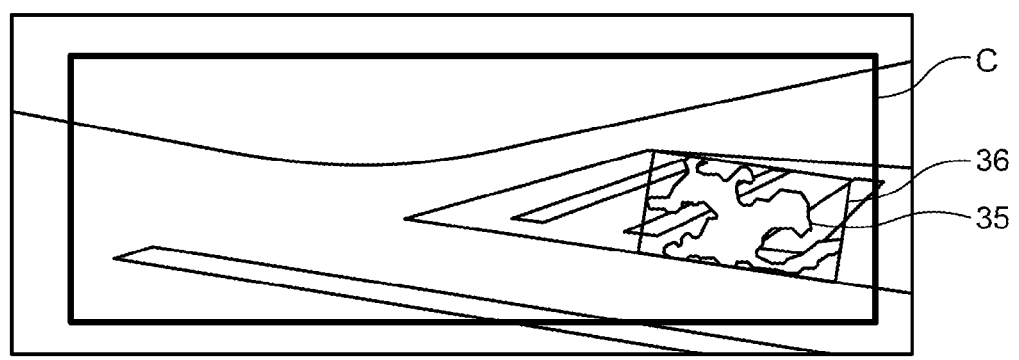
FIG. 11 is a schematic diagram illustrating the filling ratio checking.

The filling ratio checking performed by the crossing detecting unit 152c will be described. FIG. 11 is a schematic diagram illustrating the filling ratio checking. In the example illustrated in FIG. 11, a candidate region 35 is present in the crossing region C. The crossing detecting unit 152c sets a circumscribed rectangle 36 in the candidate region 35. The crossing detecting unit 152c calculates the ratio of the area of the candidate region 35 to the area of the circumscribed rectangle 36 as a filling ratio. If the filling ratio is equal to or greater than a predetermined filling ratio, the crossing detecting unit 152c leaves the subject candidate region 35. In contrast, if filling ratio is less than the predetermined filling ratio, the crossing detecting unit 152c excludes the subject candidate region.

The aspect ratio checking performed by the crossing detecting unit 152c will be described. Similarly to FIG. 11, the crossing detecting unit 152c sets a circumscribed rectangle with respect to the candidate region. For the circumscribed rectangle, the crossing detecting unit 152c calculates the aspect ratio. If the ratio of the length to the width of the circumscribed rectangle or the ratio of the width to the length of the circumscribed rectangle is less than a predetermined ratio, a crossing detecting unit 152 leaves the candidate region 35.

In contrast, if the ratio of the length to the width of the circumscribed rectangle or the ratio of the width to the length of the circumscribed rectangle is equal to or greater than the predetermined ratio, the crossing detecting unit 152c excludes the subject candidate region. If the ratio of the length to the width of the circumscribed rectangle or the ratio of the width to the length of circumscribed rectangle is equal to or greater than the predetermined ratio, this indicates that the candidate region is extraordinarily vertically long or horizontally long compared with the shape of a common traverser; therefore, it is difficult to consider that the candidate region is the detection target.

Subsequently, the crossing detecting unit 152c performs the area checking, the filling ratio checking, and the aspect ratio checking on the candidate region detected from the binary image and performs corner determination on the information on the candidate region that was not excluded.

Figure 12:
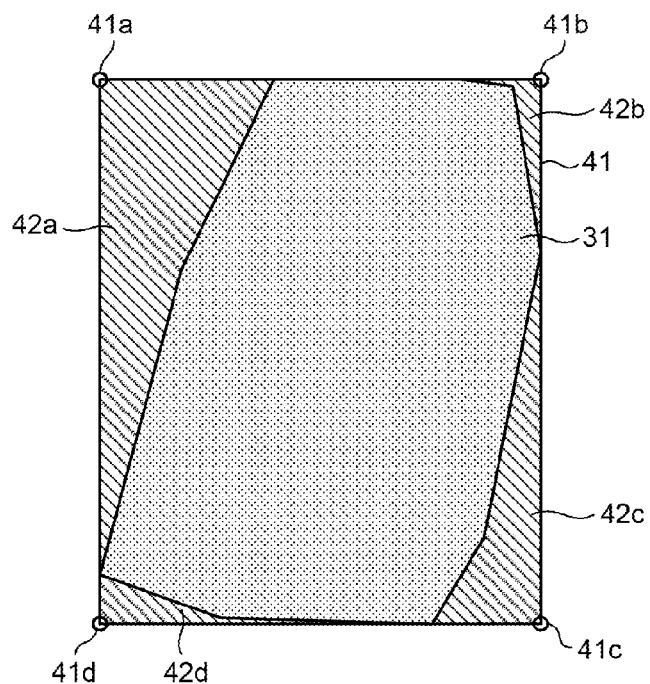
FIG. 12 is a schematic diagram illustrating a process of corner determination.

The corner determination process performed by the crossing detecting unit 152c will be described. FIG. 12 is a schematic diagram illustrating a process of corner determination. In FIG. 12, a candidate region 31 is a candidate region that was detected in the labeling process described above and that corresponds to the candidate region that was not excluded by the area checking, the filling ratio checking, and the aspect ratio checking. Furthermore, a circumscribed rectangle 41 is a circumscribed rectangle of the candidate region 31.

The crossing detecting unit 152c obtains the area of corner regions that are other than the candidate region 31 and that include corners 41a, 41b, 41c, and 41d in the circumscribed rectangle 41. The corner regions can be referred to as polygons formed by both the side constituting the circumscribed rectangle and the side constituting the candidate region. In the example illustrated in FIG. 12, the crossing detecting unit 152c obtains the area of the corner regions 42a, 42b, 42c, and 42d. The crossing detecting unit 152c excludes the candidate region on the basis of the magnitude relation of each of the corner regions. In a description below, exclusion conditions 1 to 3 for the candidate region will be described. Furthermore, in a description below, the corner regions 42a and 42c are referred to as diagonal corners. Furthermore, the corner regions 42b and 42d are referred to as inverse diagonal corners.

The exclusion condition 1 will be described. If the area of the diagonal corners is equal to or greater than a predetermined area, the crossing detecting unit 152c excludes the subject candidate region.

The exclusion condition 2 will be described. If the area of at least one of the diagonal corners is equal to or greater than a predetermined area and if the area of inverse diagonal corners is less than a predetermined area, the crossing detecting unit 152 excludes the subject candidate region.

The exclusion condition 3 will be described. If the area of the diagonal corners is equal to or greater than a predetermined area and if the magnitude of the triangle of the diagonal corners is equal to or greater than a predetermined magnitude of the triangle and if the area of inverse diagonal corners is less than a predetermined area, the crossing detecting unit 152c excludes the subject candidate region.

The thresholds used for the exclusion conditions 1 to 3 may also vary in accordance with the magnitude of the area of the circumscribed rectangle 41. For example, if the area of the circumscribed rectangle 41 is S, a threshold is obtained by dividing S by 6. Furthermore, if the value of the threshold falls below 40 pixels, the threshold is set to 40.

Figure 13:
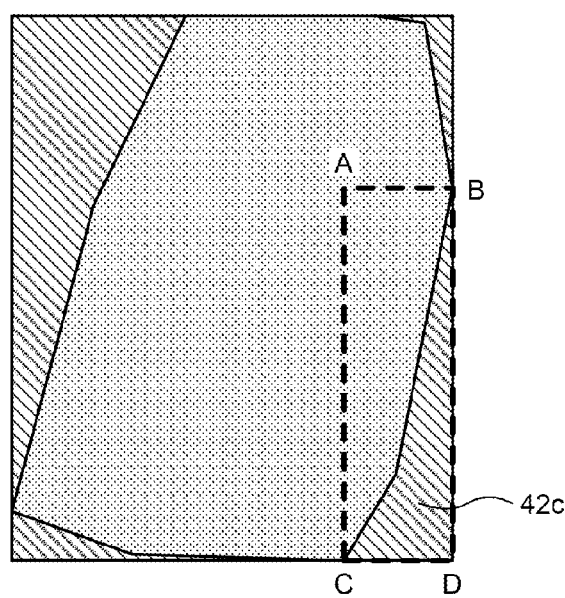
FIG. 13 is a schematic diagram illustrating a calculation method of the magnitude of a triangle.

The calculation method of the magnitude of a triangle will be described. FIG. 13 is a schematic diagram illustrating a calculation method of the magnitude of a triangle. Here, a description will be given of a case in which the magnitude of a triangle of the corner region 42c is obtained. The pixel values of the pixels included in a triangle BCD are set to 1 and the pixel values of the pixels surrounded by the triangle ABC are set to 0. Then, from among the pixels included in a rectangle ABCD, by dividing the area in which the pixel values corresponds to 1 by the rectangle ABCD, the crossing detecting unit 152c calculates the magnitude of the triangle of the corner region 42c.

The crossing detecting unit 152c detects, as a moving object, the candidate region that was not excluded by the exclusion conditions 1 to 3 described above. For example, the crossing detecting unit 152c outputs information on the coordinates of the moving object and information on the filling ratio to the reliability calculating unit 153.

The reliability calculating unit 153 is a processing unit that calculates the reliability of the moving object that is detected by the front detecting unit 152a, the side detecting unit 152b, and the crossing detecting unit 152c. The reliability calculating unit 153 registers, in an associated manner, the frame number, the moving object identification number, the detection coordinates, and the reliability in the moving object management table 142.

A description will be given of an example of a process in which the reliability calculating unit 153 calculates the reliability of the moving object detected by the front detecting unit 152a. The reliability calculating unit 153 converts, on the basis of the values of the moving object in the y coordinates, information on the range of a moving object in the x coordinates to the actual width (m) of the moving object and calculates, on the basis of the converted value, the reliability of the moving object. Here, the range of the moving object in the x coordinates corresponds to the range between x1 x2 illustrated in FIG. 9.

Figure 14:
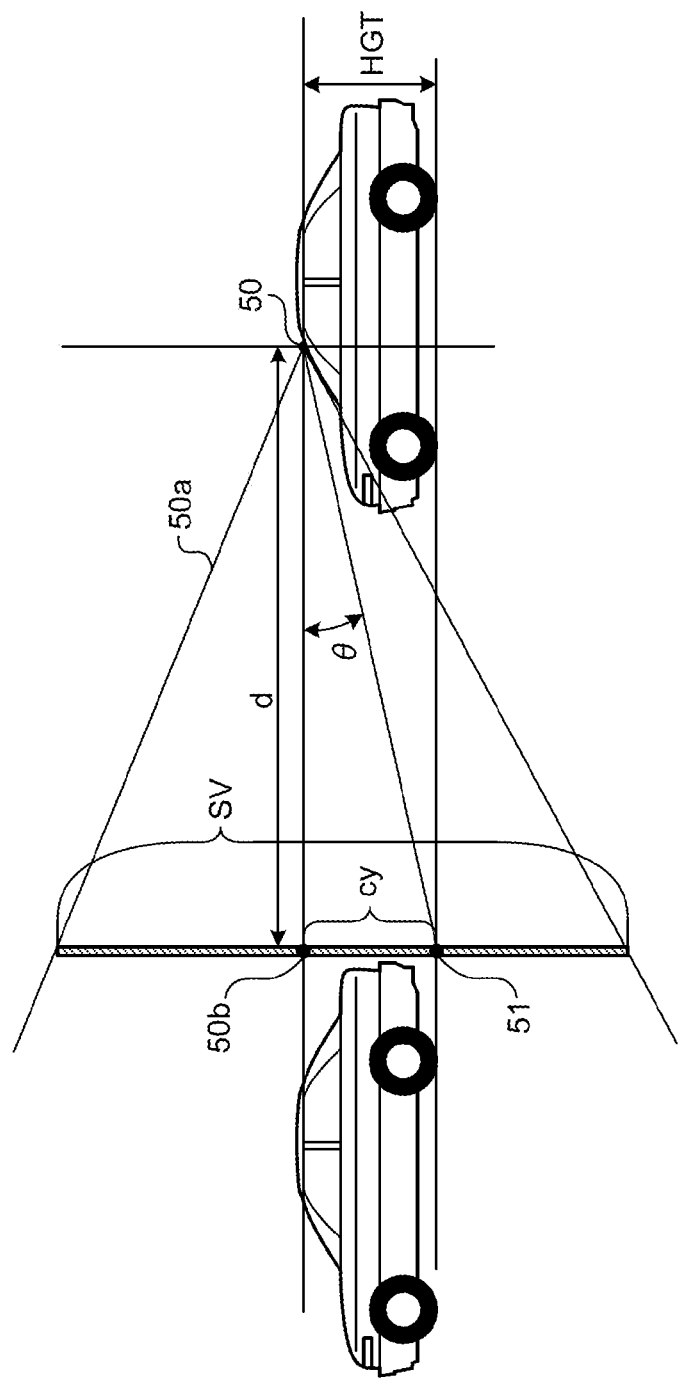
FIG. 14 is a schematic diagram illustrating a process of calculating the distance between a moving object and a camera.

A description will be given of an example of a process in which the reliability calculating unit 153 converts, on the basis of the values of the y coordinates, to the actual width of the moving object. First, the reliability calculating unit 153 calculates the distance between the moving object and the camera. FIG. 14 is a schematic diagram illustrating a process of calculating the distance between a moving object and a camera.

The reliability calculating unit 153 acquires a camera parameter 145. The camera parameter 145 includes the horizontal angle of view CH (radian) of a camera 50, the vertical angle of view CV (radian) of the camera 50, the horizontal resolution SH (pixel) in a processing frame, the vertical resolution SV (pixel) in the processing frame, and the installation height HGT (m) of the camera 50.

In FIG. 14, 50a indicates the camera field of view and 50b indicates a vanishing point. Furthermore, 51 corresponds to the coordinates of the moving object on the projection plane SV at the distance d. In below, the coordinates of the moving object is appropriately referred to as a detection position 51. In FIG. 14, represents an angle formed by the straight line connecting the camera 50 and the vanishing point 50b and the straight line connecting the camera 50 and the detection position 51. Furthermore, cy represents the distance in the vertical direction between the vanishing point 50b and the detection position 51.

Here, because Equation (1) is satisfied, is represented by Equation (2). Furthermore, by using, a distance d can be represented by Equation (3).

$$cy/SV = \theta/CV \quad (1)$$

$$\theta = CV \times cy/SV \quad (2)$$

$$d = HGT/\tan(\theta) \quad (3)$$

More specifically, Equation (2) can be represented by Equation (4). In Equation (4), VanY [pixel] represents the y coordinate of a vanishing point in a processing frame, y [pixel] represents the y coordinate of a moving object in the processing frame, and ABS represents an absolute value.

$$\theta = CV[\text{rad}] \times ABS(\text{VanY}[\text{pixel}] - y[\text{pixel}])/SV\ [\text{pixel}] \quad (4)$$

Furthermore, for the moving object and the camera distance, the distance in the x-axis direction is calculated by using Equation (5). The distance in the y-axis direction is the value of d that is obtained by using Equation (3).

$$\text{distance in the } x \text{ axis direction} = d \times \tan(CH\ [\text{rad}]/2) \times 2 \quad (5)$$

The distance d obtained by using Equation (3) above corresponds to the distance between the moving object and the camera.

For example, after the reliability calculating unit 153 calculates the distance between the moving object and the camera, the reliability calculating unit 153 calculates the width of the actual moving object from the y coordinates by using Equation (6).

$$\text{width } [m] \text{ of the actual moving object} = d[m] \text{ range of the moving object of the } x \text{ coordinates } [\text{pixel}]/y \text{ coordinates } [\text{pixel}] \quad (6)$$

The reliability calculating unit 153 calculates the absolute value of the difference between the width (m) of the actual moving object and the width of an average vehicle. The reliability calculating unit 153 normalizes the absolute value of the difference such that the value approaches 100 as the absolute value of the difference approaches zero and the value becomes zero as the absolute value of the difference is increased and then calculates the normalized value as the reliability. The reliability calculating unit 153 calculates the reliability for each moving object included in the front region F in each frame.

The reliability calculating unit 153 associates, for each frame number, the moving object identification number, the detection coordinates, and the reliability and registers them in the table 142a in the moving object management table 142. The reliability calculating unit 153 allocates a unique moving object identification number to each moving object. The detection coordinates correspond to the coordinates of a moving object.

A description will be given of an example of a process in which the reliability calculating unit 153 calculates the reliability of the moving object detected by the side detecting unit 152b. The process in which the reliability calculating unit 153 calculates the reliability of the moving object detected by the side detecting unit 152b is the same as the process of calculating the reliability of a moving object detected by the front detecting unit 152a. The reliability calculating unit 153 calculates the reliability for each moving object included in the side region S in each frame.

The reliability calculating unit 153 associates, for each frame number, the moving object identification number, the detection coordinates, and the reliability and registers them in the table 142b in the moving object management table 142. The reliability calculating unit 153 allocates a unique moving object identification number to each moving object. The detection coordinates correspond to the coordinates of a moving object.

A description will be given of an example of a process in which the reliability calculating unit 153 calculates the reliability of the moving object detected by the crossing detecting unit 152c. For example, the reliability calculating unit 153 may also calculate, on the basis of the filling ratio, the reliability of a moving object in the crossing region C. The reliability calculating unit 153 calculates the reliability by making the reliability approach 100 as the filling ratio is increased and making the reliability approach zero as the filling ratio is decreased.

The reliability calculating unit 153 associates, for each frame number, the moving object identification number, the detection coordinates, and the reliability and registers them in the table 142c in the moving object management table 142. The reliability calculating unit 153 allocates a unique moving object identification number to each moving object. The detection coordinates correspond to the coordinates of a moving object.

The concatenating unit 154 is a processing unit that concatenates the same moving objects in time series. On the basis of the table 142a in the moving object management table 142, the concatenating unit 154 concatenates, in time series, the same moving objects detected from the front region F. The concatenating unit 154 concatenates, in time series on the basis of the table 142b, the same moving objects detected from the side region S. The concatenating unit 154 concatenates, in time series on the basis of the table 142c, the same moving objects detected from the crossing region C. The concatenating unit 154 registers the results of concatenation obtained in the front region F, the side region S, and the crossing region C in the concatenation management table 143.

A description will be given of a process in which the concatenating unit 154 concatenates, in time series, the same moving objects detected from the front region F. The concatenating unit 154 specifies a region Nc where a region Na of a predetermined range, in which the detection coordinates in an N frame are centered, overlaps with a region Nb of a predetermined range, in which the detection coordinates in an N+1 frame. If the size of the region Nc is equal to or greater than a threshold, the concatenating unit 154 concatenates the moving object in the N frame with the moving object in the N+1 frame. For example, if the ratio of the region Nc to the region of the predetermined range is equal to or greater than 50%, the concatenating unit 154 may perform concatenation.

In addition to the process described above, the concatenating unit 154 may also concatenate each of the moving objects on the basis of the color in a region. For example, if the color of the region Na and the color of the region Nb are the same color tone, the concatenating unit 154 concatenates the moving object in the N frame with the moving object in the N+1 frame. The concatenating unit 154 acquires color information on the regions Na and Nb from the image data in the drive recorder information 141. For example, if the luminance value of the image in a region is equal to or greater than 128, the concatenating unit 154 determines that the color in the region is a white color tone. If the luminance value of the image in a region is less than 128, the concatenating unit 154 determines that the color in the region is a black color tone.

The concatenating unit 154 associates, for the front region F, the concatenation identification number and the moving object identification number group that includes each of the moving object identification numbers of the concatenated moving objects and registers them in the table 143a.

A description will be given of a process in which the concatenating unit 154 concatenates, in time series, the same moving objects detected from the side region S. The process in which the concatenating unit 154 concatenates, in time series, the moving objects in the side region S may be the same process as that of concatenating, in time series, the moving objects in the front region F described above.

The concatenating unit 154 associates, for the side region S, the concatenation identification number, and the moving object identification number group that includes each of the moving object identification numbers of the concatenated moving objects and registers them in the table 143b.

A description will be given of a process in which the concatenating unit 154 concatenates, in time series, the same moving objects detected from the crossing region C. The process in which the concatenating unit 154 concatenates, in time series, the moving objects in the crossing region C may be the same process as that of concatenating, in time series, the moving objects in the front region F. Furthermore, the concatenating unit 154 concatenates the moving object in the N frame with the moving object in the N+1 frame by using a threshold that is smaller than that used in the front region F. For example, if the ratio of the region Nc to the region of the predetermined range is equal to or greater than 10%, the concatenating unit 154 may also perform the concatenation. The reason for this is because a travel amount of the moving object detected in the crossing region C is great and thus the overlapped region tends to decrease.

The concatenating unit 154 associates, for the crossing region C, the concatenation identification number and the moving object identification number group that includes each of the moving object identification numbers of the concatenated moving objects and registers them in the table 143c.

For the moving objects in each frame, the concatenating unit 154 concatenates, with priority, the moving objects in which the reliability is equal to or greater than the threshold. However, the reliability of the moving object may possibly temporarily be decreased. Accordingly, there may be a case in which the concatenating unit 154 is not able to concatenate the moving objects in which the reliability is equal to or greater than the threshold. In such a case, the concatenating unit 154 may also include the moving object in which the reliability is less than the threshold in the concatenation candidate and concatenate each of the moving objects.

The concatenating unit 154 may also specify a moving object in which the reliability is the maximum, use the specified moving object in which the reliability is the maximum as the origin, and concatenate the moving objects in each frame.

Figure 15:
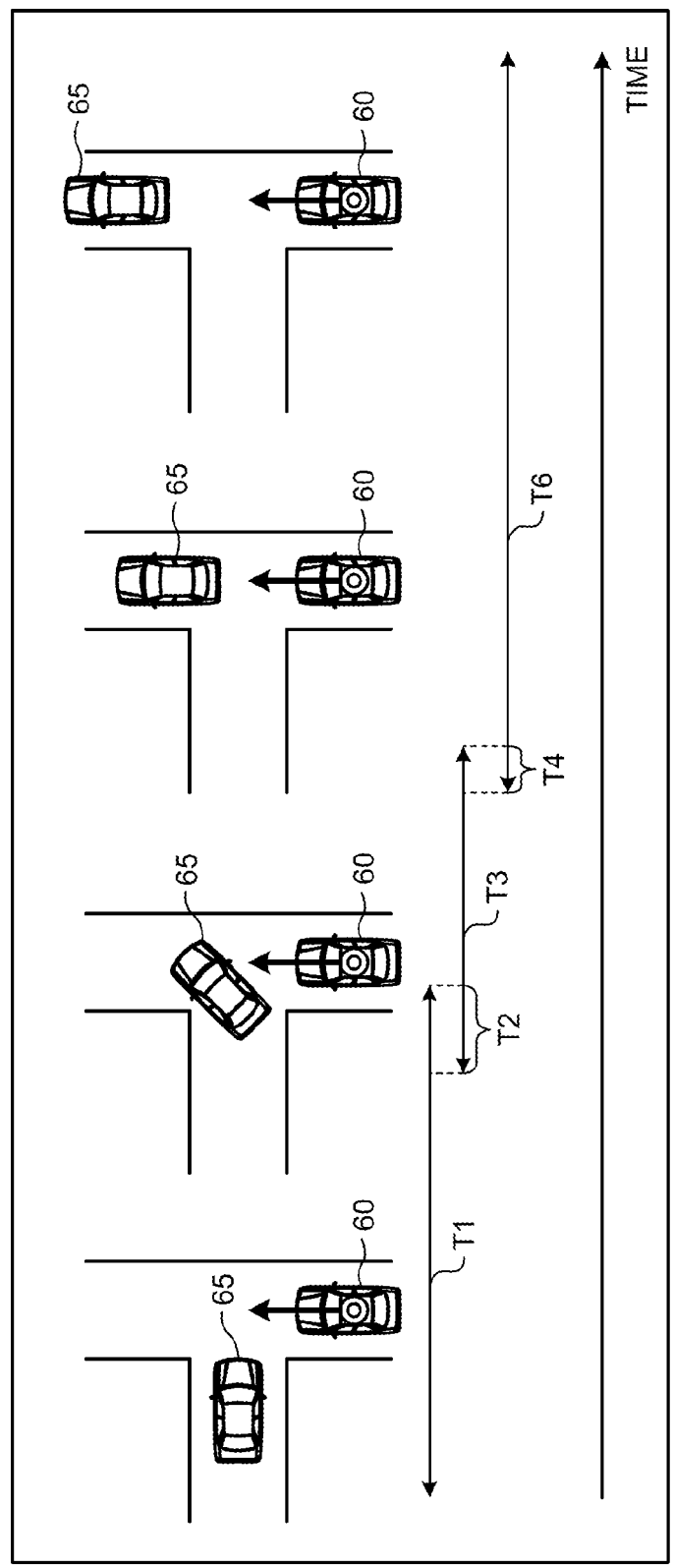
FIG. 15 is a schematic diagram (No. 1) illustrating a process performed by an integrating unit.
Figure 16:
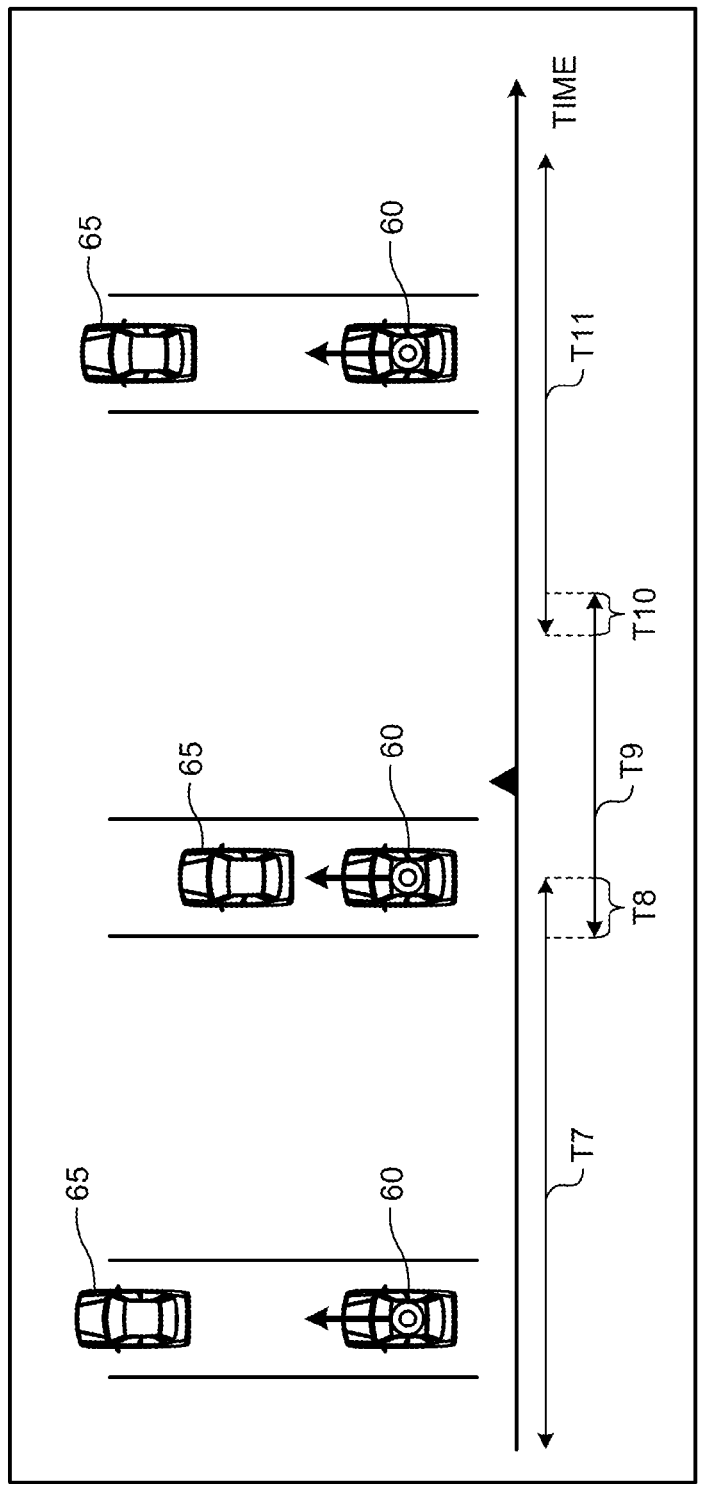
FIG. 16 is a schematic diagram (No. 2) illustrating a process performed by an integrating unit.

The integrating unit 155 is a processing unit that creates the integration result table 144 by integrating the moving objects in the tables 143a, 143b, and 143c in the concatenation management table 143. FIGS. 15 and 16 are schematic diagrams each illustrating a process performed by an integrating unit. In FIG. 15, a vehicle 60 is the own vehicle having mounted thereon a drive recorder. A vehicle 65 is another vehicle associated with the moving object. The horizontal axis illustrated in FIG. 15 is the time axis.

In FIG. 15, as an example, a description will be given of a case in which the side detecting unit 152b detects a moving object 65 at a time period T1, the crossing detecting unit 152c detects the moving object 65 at a time period T3, and the front detecting unit 152a detects the moving object 65 at a time period T6. Here, at the time period T2, there is a possibility that the side detecting unit 152b and the crossing detecting unit 152c detect the same moving object 65. Furthermore, at a time period T4, there is a possibility that the crossing detecting unit 152c and the front detecting unit 152a detect the same moving object 65.

The integrating unit 155 determines, at the time period T2, whether the side detecting unit 152b and the crossing detecting unit 152c detect the same moving object 65. Furthermore, the integrating unit 155 determines, at the time period T4, whether the crossing detecting unit 152c and the front detecting unit 152a detect the same moving object 65. If the same moving object 65 is detected at T2 and T4, the integrating unit 155 integrates a group of the moving objects detected at the time periods T1, T3, and T6 and classifies the moving objects in the same group. The integrating unit 155 registers the integration result in the integration result table 144.

A description will be given of a process in which the integrating unit 155 determines, at the time period T2, whether the side detecting unit 152b and the crossing detecting unit 152c detect the same moving object 65.

The integrating unit 155 obtains, at the time period T2, a region Ma of a predetermined range in which the detection coordinates of the moving object detected by the side detecting unit 152b are centered and obtains, at the time period T2, a region Mb of a predetermined range in which the detection coordinates of the moving object detected by the crossing detecting unit 152c are centered. The integrating unit 155 obtains the regions Ma and Mb on the basis of the moving object management table 142 and the concatenation management table 143.

The integrating unit 155 specifies a region Mc in which the region Ma overlaps with the region Mb. If the size of the region Mc is equal to or greater than a threshold, the integrating unit 155 integrates the group of the moving objects detected by the side detecting unit 152b at the time period T1 with the group of the moving objects detected by the crossing detecting unit 152c at the time period T3.

In addition to the process described above, the integrating unit 155 may also integrate, on the basis of the color in the regions, the group of the moving objects with the group of the moving objects. For example, if the color of the region Ma and the color of the region Mb are the same color tone, the integrating unit 155 integrates the group of the moving objects detected by the side detecting unit 152b at the time period T1 with the group of the moving objects detected by the crossing detecting unit 152c at the time period T3. A description of a process of determining whether the regions are the same color tone is the same as that described in the concatenating unit 154.

Subsequently, a description will be given of a process in which the integrating unit 155 determines, at the time period T4, whether the crossing detecting unit 152c and the front detecting unit 152a detect the same moving object 65.

The integrating unit 155 obtains, at the time period T4, a region La of a predetermined range in which the detection coordinates of the moving object detected by the crossing detecting unit 152c are centered and obtains, at the time period T4, a region Lb of a predetermined range in which the detection coordinates of the moving object detected by the front detecting unit 152a are centered. The integrating unit 155 obtains the regions La and Lb on the basis of the moving object management table 142 and the concatenation management table 143.

The integrating unit 155 specifies a region Lc in which the region La overlaps with the region Lb. If the size of the region Lc is equal to or greater than a threshold, the integrating unit 155 integrates the group of the moving objects detected by the crossing detecting unit 152c at the time period T3 and the group of the moving objects detected by the front detecting unit 152a at the time period T6.

In addition to the process described above, the integrating unit 155 may also integrate, on the basis of the color in the regions, the group of the moving objects with the group of the moving objects. For example, if the color of the region La and the color of the region Lb are the same color tone, the integrating unit 155 integrates the group of the moving objects detected by the side detecting unit 152b at the time period T3 and the group of the moving objects detected by the crossing detecting unit 152c at the time period T6. A description of determining whether the regions are the same color tone is the same as that described in the concatenating unit 154.

By performing the process described by using FIG. 15, the integrating unit 155 integrates the group of the moving objects detected at each of the time periods T1, T3, and T6 and registers the information in the integration result table 144. The integrating unit 155 allocates a unique integration identification number to each integrated moving object identification number.

FIG. 16 will be described. In FIG. 16, as an example, a description will be given of a case in which the front detecting unit 152a detects the moving object 65 at a time period T7, the crossing detecting unit 152c detects the moving object 65 at a time period T9, and the front detecting unit 152a detects the moving object 65 at the time period T11. For example, if the moving object 65 approaches too close to the vehicle 60, there may be a case in which the moving object 65 is not able to be detected by the front detecting unit 152a; therefore, by using the detection result of the moving object performed by the crossing detecting unit 152c, the time period that is not detected by the front detecting unit 152a can be compensated.

The integrating unit 155 determines, at a time period T8, whether the front detecting unit 152a and the crossing detecting unit 152c detect the same moving object 65. Furthermore, the integrating unit 155 determines, at a time period T10, whether the front detecting unit 152a and the crossing detecting unit 152c detect the same moving object 65.

A description will be given of a process in which the integrating unit 155 determines, at the time period T8, whether the front detecting unit 152a and the crossing detecting unit 152c detect the same moving object 65.

The integrating unit 155 obtains, at the time period T8, a region Ka of a predetermined range in which the detection coordinates of the moving object detected by the front detecting unit 152a are centered and obtains, at the time period T8, a region Kb of a predetermined range in which the detection coordinates of the moving object detected by the crossing detecting unit 152c are centered. The integrating unit 155 obtains the regions Ka and Kb on the basis of the moving object management table 142 and the concatenation management table 143.

The integrating unit 155 specifies a region Kc in which a region Ka overlaps with a region Kb. If the size of the region Kc is equal to or greater than the threshold, the integrating unit 155 integrates the group of the moving objects detected by the front detecting unit 152a at the time period T8 with the group of the moving objects detected by the crossing detecting unit 152c at the time period T8. Furthermore, it is assumed that, if the region Ka and the region Kb are the same color tone, the integrating unit 155 integrates the groups of the moving objects.

A description will be given of a process in which the integrating unit 155 determines, at a time period T10, whether the crossing detecting unit 152c and the front detecting unit 152a detect the same moving object 65. The integrating unit 155 obtains, at the time period T10, a region Ja of a predetermined range in which the detection coordinates of the moving object detected by the crossing detecting unit 152c are centered and obtains, at the time period T10, a region Jb of the predetermined range in which the detection coordinates of the moving object detected by the front detecting unit 152a are centered. The integrating unit 155 obtains the regions Ja and Jb on the basis of the moving object management table 142 and the concatenation management table 143.

The integrating unit 155 specifies a region Jc in which the region Ja overlaps with the region Jb. If the size of the region Jc is equal to or greater than a threshold, the integrating unit 155 integrates the group of the moving objects each of which was detected by the crossing detecting unit 152c at the time period T10 with the group of the moving objects detected by the front detecting unit 152a at the time period T10. Furthermore, it is assumed that, if the region Ja and the region Jb are the same color tones, the integrating unit 155 integrates the groups of the moving objects.

By performing the process described with reference to FIG. 16, the integrating unit 155 integrates the groups of the moving objects detected at each of the time periods T7, T9, and T11 and registers the information in the integration result table 144. The integrating unit 155 allocates a unique integration identification number to each of the connected moving object identification numbers.

Figure 17:
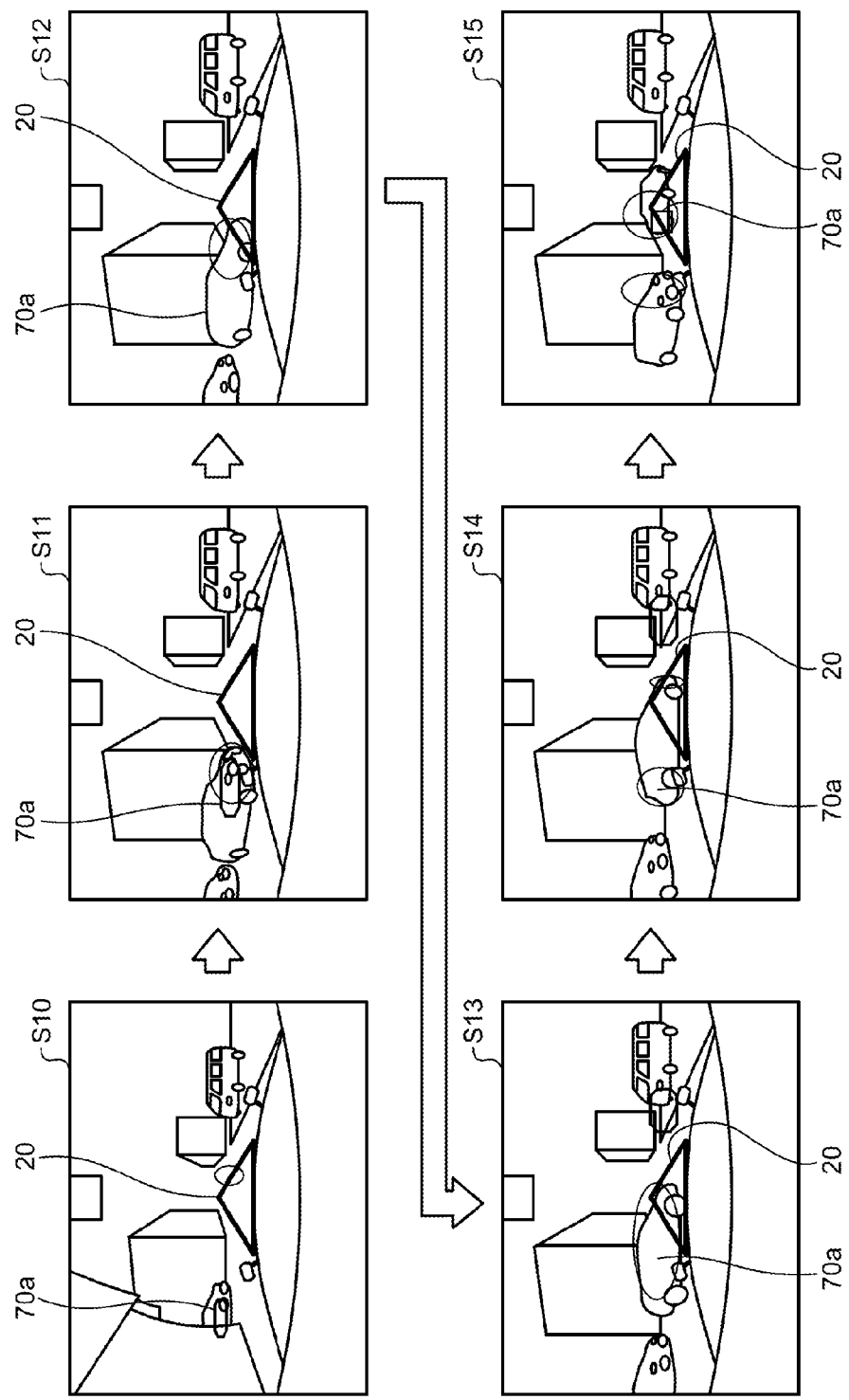
FIG. 17 is an image drawing of an integration process.

FIG. 17 is an image drawing of an integration process. In FIG. 17, 20 included in each Step S corresponds to the detection region described above. At Step S10, the side detecting unit 152b detects a moving object 70a. At Step S11, the side detecting unit 152b and the crossing detecting unit 152c detects the moving object 70a. At Step S12, the crossing detecting unit 152c detects the moving object 70a.

At Step S13, the crossing detecting unit 152c detects the moving object 70a. At Step S14, the crossing detecting unit 152c detects the moving object 70a. At Step S15, the front detecting unit 152a and the crossing detecting unit 152c detect the moving object 70a.

For example, it is assumed that the reliability of the moving objects detected at Steps S11, S12, and S15 illustrated in FIG. 17 is equal to or greater than a threshold and it is assumed that the reliability of the moving objects detected at Steps S10, S13, and S14 is less than the threshold. Even if the reliability of the moving objects 70a detected at Steps S10, S13, and S14 is less than the threshold, if the reliability of the moving objects 70a detected at Steps S11, S12, and S15 illustrated in FIG. 17 is high, the integrating unit 155 concatenates the moving objects 70a detected at Steps S10 to S15.

The classifying unit 156 is a processing unit that classifies, on the basis of the integration result table 144 and the moving object management table, the movement of the detected moving object into the front, the crossing, and the side. In below, a description of a process performed by the classifying unit 156 will be specifically described.

The classifying unit 156 calculates, for each integration identification number in the integration result table 144, the distance of the moving object in the x direction and the distance of the moving object in the y direction by using the Equation (3) and the Equation (5), respectively, described in the process performed by the reliability calculating unit 153. The distance in the x direction and the distance in the y direction are the distance obtained when the own vehicle having mounted thereon a drive recorder is defined as the origin.

The classifying unit 156 classifies a moving object running in front of the own vehicle in a predetermined time period into the "front". For example, if, in the predetermined time period, the distance in the x direction is less than a threshold Fx and if the distance in the y direction is less than a threshold Fy, the classifying unit 156 classifies the moving object associated with the integration identification number into the "front".

Figure 18:
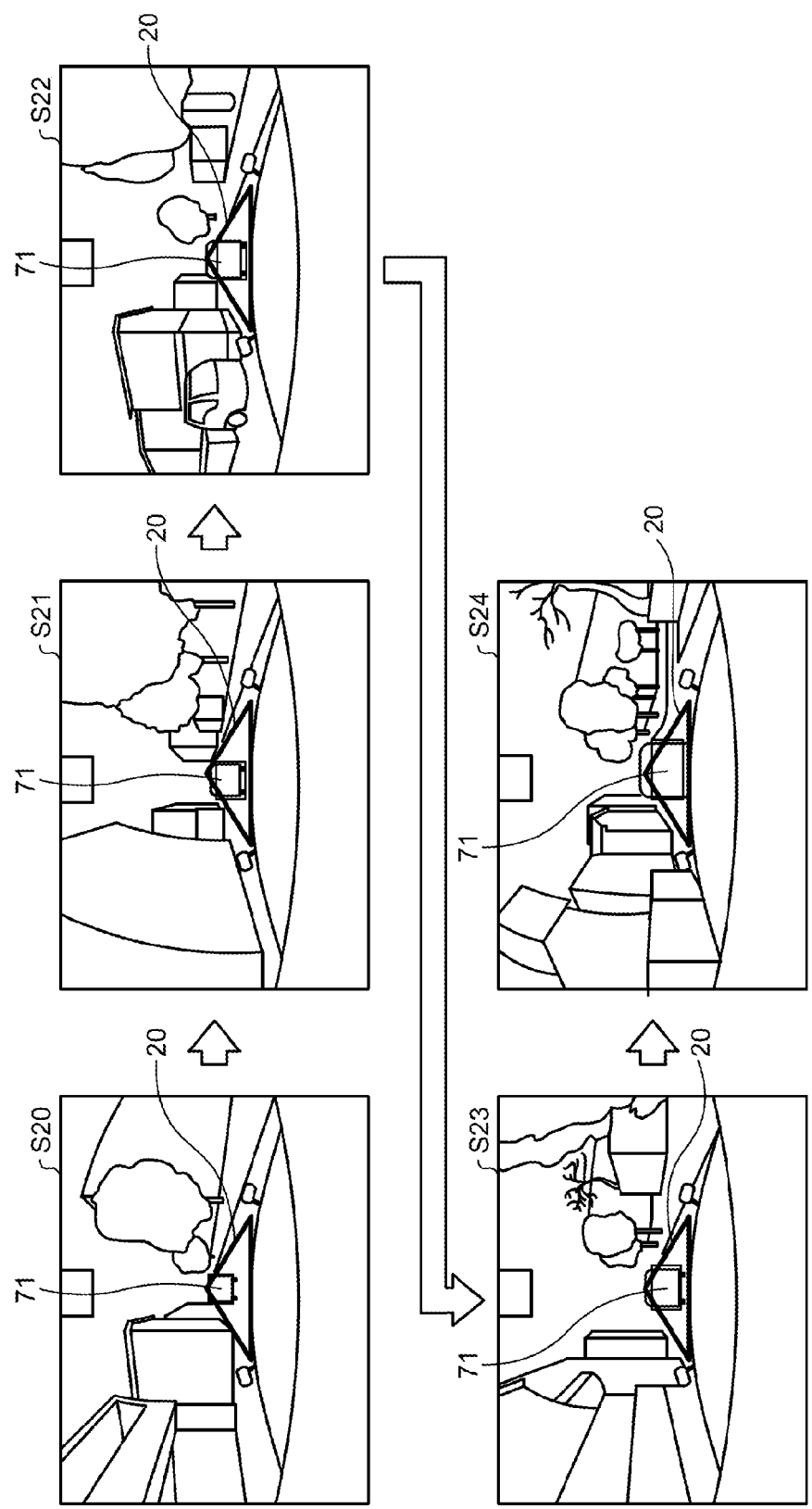
FIG. 18 is a schematic diagram illustrating an example of a moving object classified into the front.

FIG. 18 is a schematic diagram illustrating an example of a moving object classified into the front. As illustrated in FIG. 18, at Steps S20, S21, S22, S23, and S24, a moving object 71 hardly moves from the vicinity of the detection region 20. For the moving object 71 having such movement, the distance in the x direction is less than the threshold Fx and the distance in the y direction is less than the threshold Fy. Accordingly, the classifying unit 156 classifies the moving object 71 into the "front".

The classifying unit 156 classifies the moving object running in front of the own vehicle from the right to the left or from the left to the right into the "crossing". For example, if the moving distance in the x direction is equal to or greater than a threshold Cx, the classifying unit 156 classifies the moving object associated with the integration identification number into the "crossing".

Figure 19:
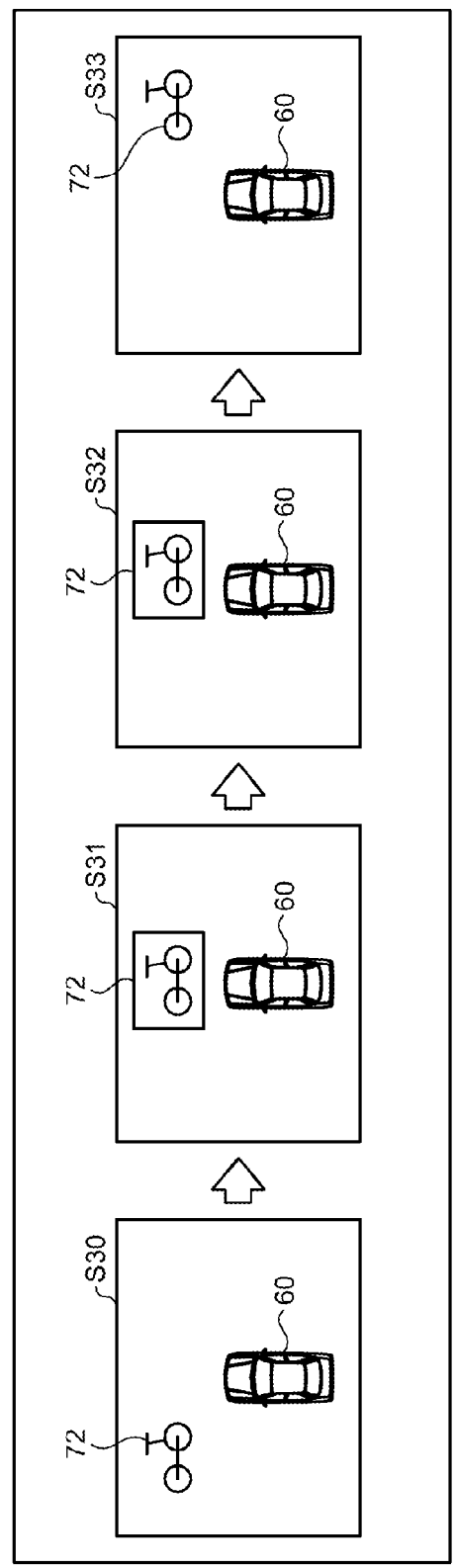
FIG. 19 is a schematic diagram illustrating an example of a moving object classified into the crossing.

FIG. 19 is a schematic diagram illustrating an example of a moving object classified into the crossing. As illustrated in FIG. 19, at Steps S30, S31, S32, and S33, a moving object 72 crosses the own vehicle 60 and, at Steps S31 and S32, the moving object 72 is detected. For the moving object 72 having such movement, the distance in the x direction is equal to or greater than the threshold Cx. Accordingly, the classifying unit 156 classifies the moving object 72 into the "crossing".

The classifying unit 156 classifies the moving object running the side of the own vehicle or the moving object moving from the side to the front of the own vehicle into the "side". For example, if the state in which the distance in the x direction is equal to or greater than a threshold Sx is maintained in a predetermined time period, the classifying unit 156 classifies the moving object associated with the integration identification number into the "side". Furthermore, the classifying unit 156 classifies the moving object, in which the distance in the y direction becomes a threshold Sy after the process in the x direction becomes equal to or greater than a threshold Sx in a predetermined time period, into the "side".

Figure 20:
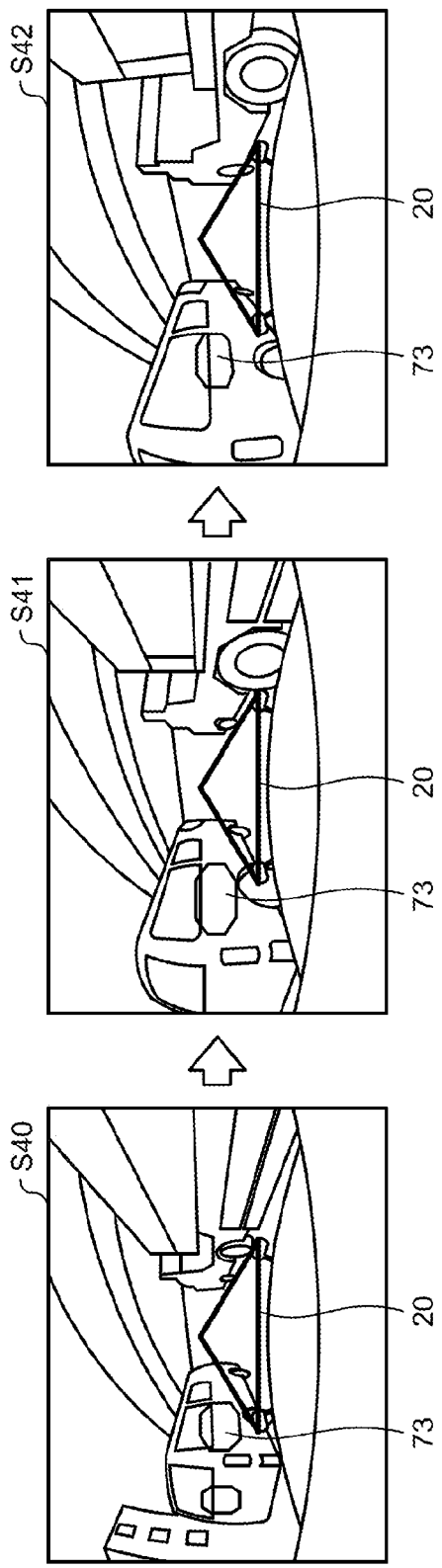
FIG. 20 is a schematic diagram (No. 1) illustrating an example of a moving object classified into the side.
Figure 21:
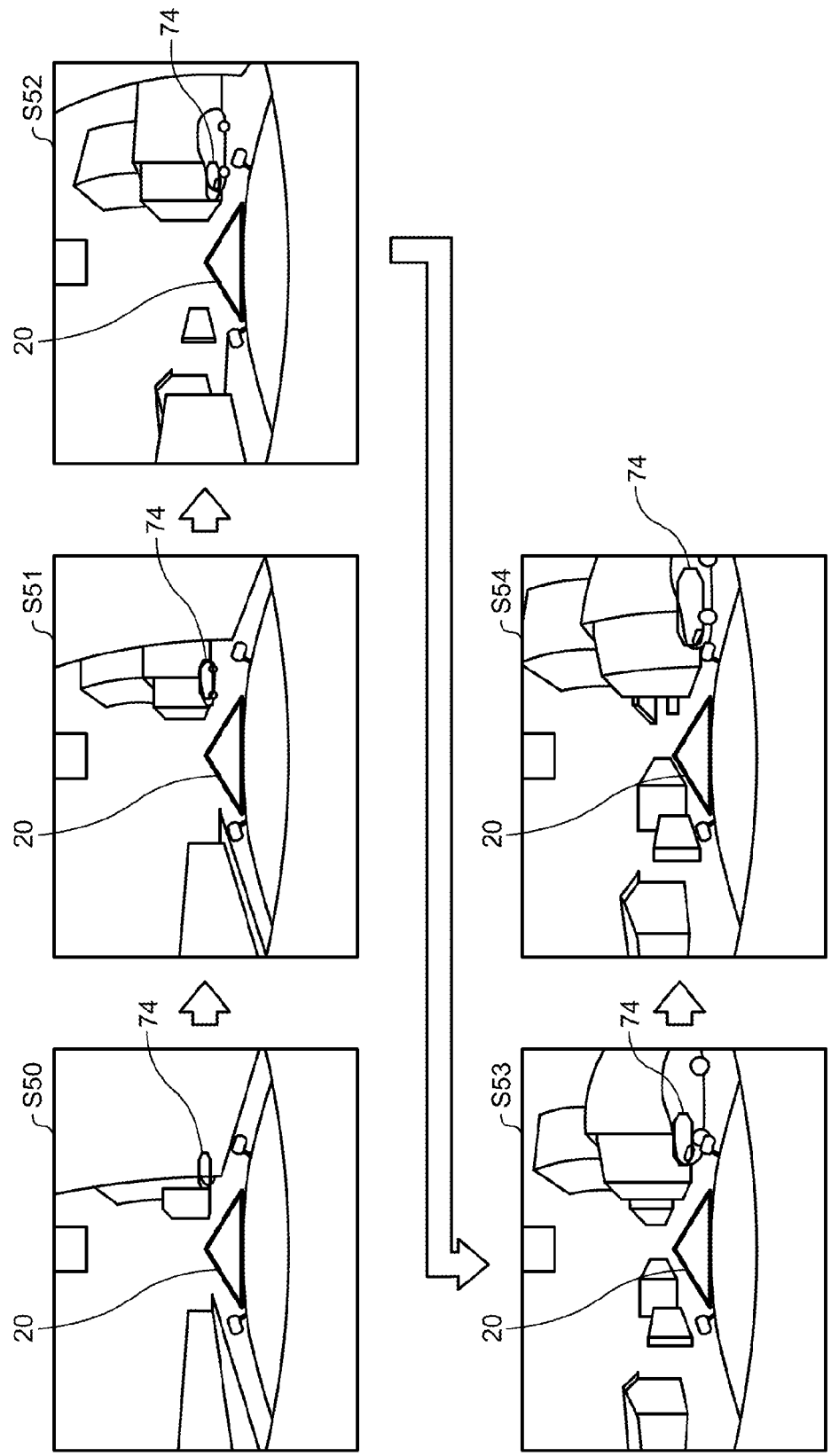
FIG. 21 is a schematic diagram (No. 2) illustrating an example of a moving object classified into the side.

FIGS. 20 and 21 are schematic diagrams each illustrating an example of a moving object classified into the side. As illustrated in FIG. 20, a moving object 73 is detected at Steps S40, S41, and S42 and hardly moves from the side of the detection region 20. For such the moving object 73, the state in which the distance in the x direction is equal to or greater than the threshold Sx is maintained. Accordingly, the classifying unit 156 classifies the moving object 73 into the "side".

As illustrated in FIG. 21, at Steps S50, S51, S52, S53, and S54, a moving object 74 is detected and frequently moves the side of the detection region 20. For such the moving object 74, the state in which the distance in the x direction is equal to or greater than the threshold Sx is maintained. Accordingly, the classifying unit 156 classifies the moving object 74 into the "side".

The classifying unit 156 outputs the information in which the integration identification number is associated with the classification result to the evaluating unit 157. The magnitude relation of the threshold in the x direction described above is defined to be represented by the threshold Cx>the threshold Sx>the threshold Fx. The magnitude relation of the threshold in the y direction is defined to be represented by the threshold Sy>the threshold Fy.

The evaluating unit 157 is a processing unit that evaluates the cause of a near miss on the basis of the classification result obtained by the classifying unit 156. The evaluating unit 157 outputs the evaluation result to the displaying unit 130.

For example, if the moving object specified by the integration identification number is classified into the "front", the evaluating unit 157 evaluates that the cause of a near miss due to this moving object "depends on a person". For example, if a moving object is classified into the front, this means that, when a driver brakes suddenly due to a failure to look ahead carefully, the moving object is captured by the drive recorder.

In contrast, if the moving object specified by the integration identification number is classified into the "crossing" or the "side", the evaluating unit 157 evaluates that the cause of a near miss due to this moving object "depends on a location". For example, if a moving object is classified into the crossing or the side, this means that the location is a dangerous location in which someone runs out into a street, which results in a delayed discovery by the driver.

Figure 22:
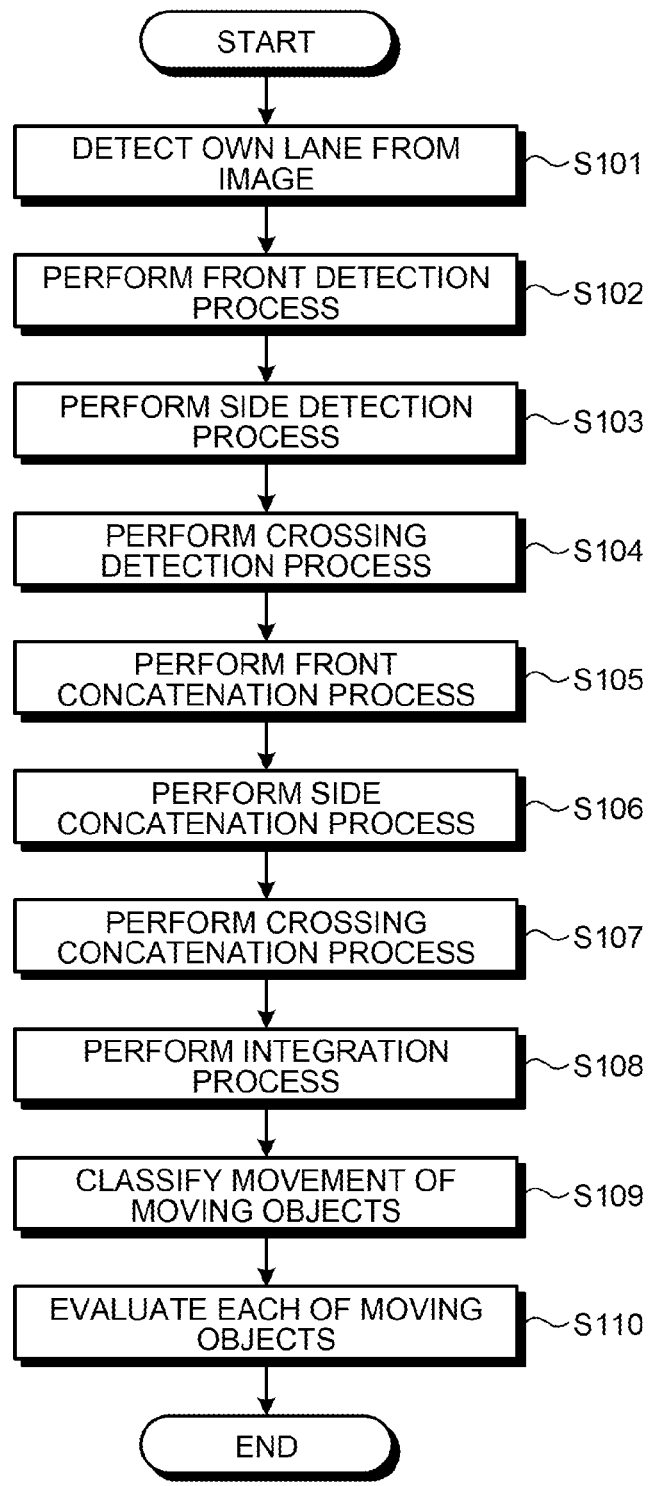
FIG. 22 is a flowchart illustrating the flow of a process performed by the image processing apparatus according to the second embodiment.

In the following, a description will be given of the flow of a process performed by the image processing apparatus 100 according to the second embodiment. FIG. 22 is a flowchart illustrating the flow of a process performed by the image processing apparatus according to the second embodiment. As illustrated in FIG. 22, the image processing apparatus 100 detects the own lane from an image (Step S101).

The image processing apparatus 100 performs a front detection process (Step S102). The front detection process corresponds to a process of detecting a moving object from the front region F. The image processing apparatus 100 performs a side detection process (Step S103). The side detection process corresponds to a process of detecting a moving object from the side region S. The image processing apparatus 100 performs a crossing detection process (Step S104). The image processing apparatus 100 may also perform each of the processes at Steps S102, S103, and S104 in parallel.

The image processing apparatus 100 performs a front concatenation process (Step S105). The front concatenation process corresponds to a process of concatenating each of the moving objects detected from the front region F. The image processing apparatus 100 performs a side concatenation process (Step S106). The side concatenation process corresponds to a process of concatenating each of the moving objects detected from the side region S. The image processing apparatus 100 performs a crossing concatenation process (Step S107). The crossing concatenation process corresponds to a process of concatenating each of the moving objects detected from the crossing region C. The image processing apparatus 100 may also perform each of the processes at Steps S105, S106, and S107 in parallel.

The image processing apparatus 100 performs an integration process (Step S108). The integration process is a process of integrating information on the concatenated moving object detected in the front region F, the side region S, and the crossing region C. The image processing apparatus 100 classifies the movement of the moving objects (Step S109) and evaluates each of the moving objects (Step S110).

Figure 23:
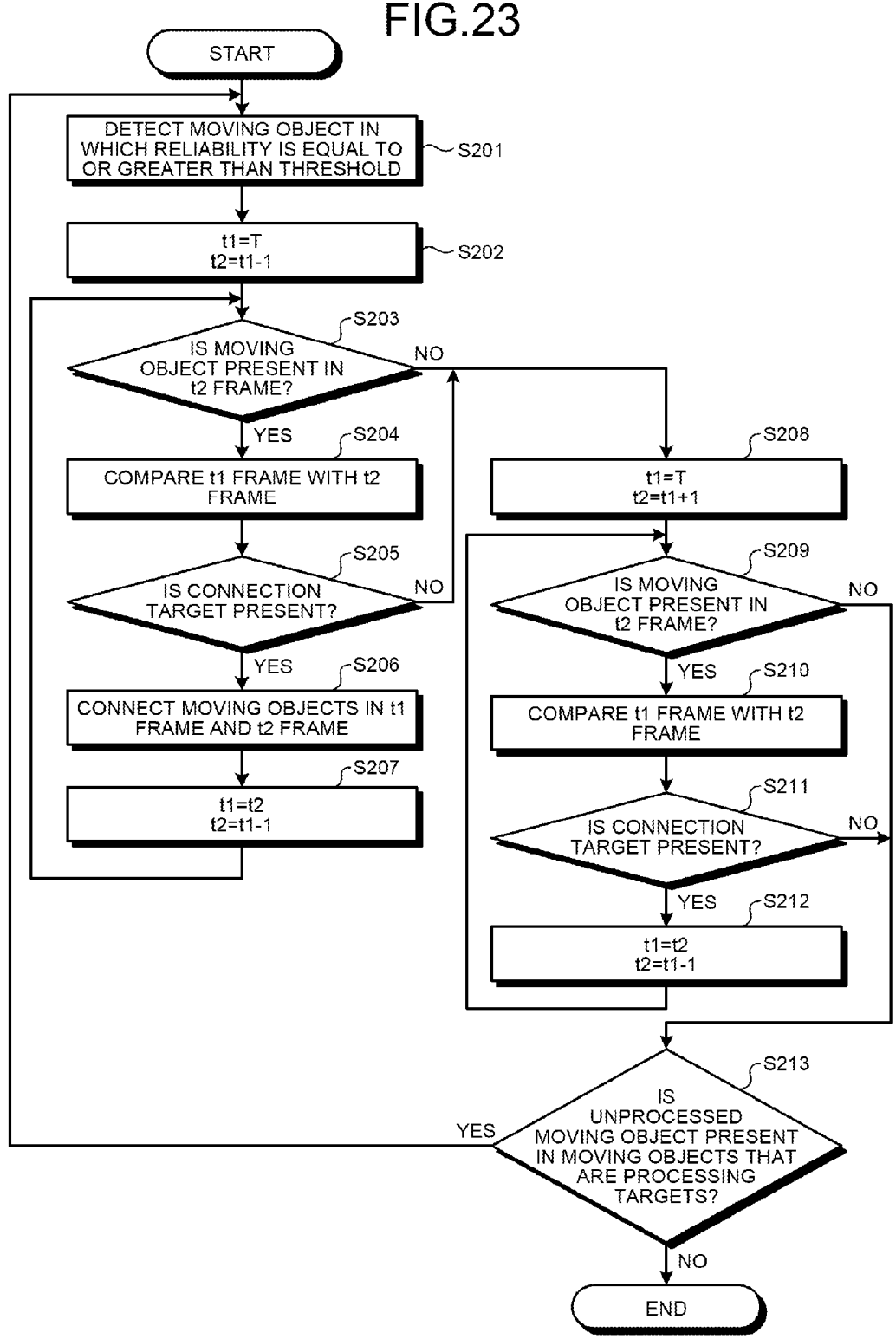
FIG. 23 is a flowchart illustrating the flow of a concatenation process.

In the following, a description will be given of an example of the flow of a process of the concatenation process indicated at Steps S105, S106, and S107. FIG. 23 is a flowchart illustrating the flow of a concatenation process. As illustrated in FIG. 23, the image processing apparatus 100 detects the moving object in which the reliability is equal to or greater than the threshold (Step S201). For example, the frame that includes the detected moving object is represented by T.

The image processing apparatus 100 sets the value of T to t1 and sets the value of t1−1 to t2 (Step S202). The image processing apparatus 100 determines whether a moving object is present in a t2 frame (Step S203). If a moving object is present (Yes at Step S203), the image processing apparatus 100 compares a t1 frame with the t2 frame (Step S204) and determines whether a connection target is present (Step S205). If a connection target is not present (No at Step S205), the image processing apparatus 100 proceeds to Step S208.

In contrast, if a connection target is present (Yes at Step S205), the image processing apparatus 100 connects the moving object in the t1 frame and the moving object in the t2 frame (Step S206). The image processing apparatus 100 sets the value of t2 to t1 and sets the value of t1−1 to t2 (Step S207) and proceeds to Step S203.

However, at Step S203, if a moving object is not present in the t2 frame (No at Step S203), the process proceeds to Step S208. The image processing apparatus 100 sets the value of T to t1 and sets the value of t1+1 to t2 (Step S208).

The image processing apparatus 100 determines whether a moving object is present in the t2 frame (Step S209). If a moving object is present in the t2 frame (Yes at Step S209), the image processing apparatus 100 compares the t1 frame with the t2 frame (Step S210) and determines whether a connection target is present (Step S211). If a moving object is not present in the t2 frame (No at Step S209), the image processing apparatus 100 proceeds to Step S213.

In contrast, if a moving object is present in the t2 frame (Yes at Step S209), the image processing apparatus 100 compares the t1 frame with the t2 frame (Step S210) and determines whether a connection target is present (Step S211). If a connection target is not present (No at Step S211), the image processing apparatus 100 proceeds to Step S213.

In contrast, if connection target is present (Yes at Step S211), the image processing apparatus 100 sets the value of t2 to t1 and sets the value of t1−1 to t2 (Step S212) and proceeds to Step S209.

The image processing apparatus 100 determines whether an unprocessed moving object is present from among the moving objects that are the processing targets (Step S213). If an unprocessed moving object is present from among the moving objects that are the processing targets (Yes at Step S213), the image processing apparatus 100 proceeds to Step S201. In contrast, if an unprocessed moving object is not present from among the moving objects that are the processing targets (No at Step S213), the image processing apparatus 100 ends the concatenation process.

Figure 24:
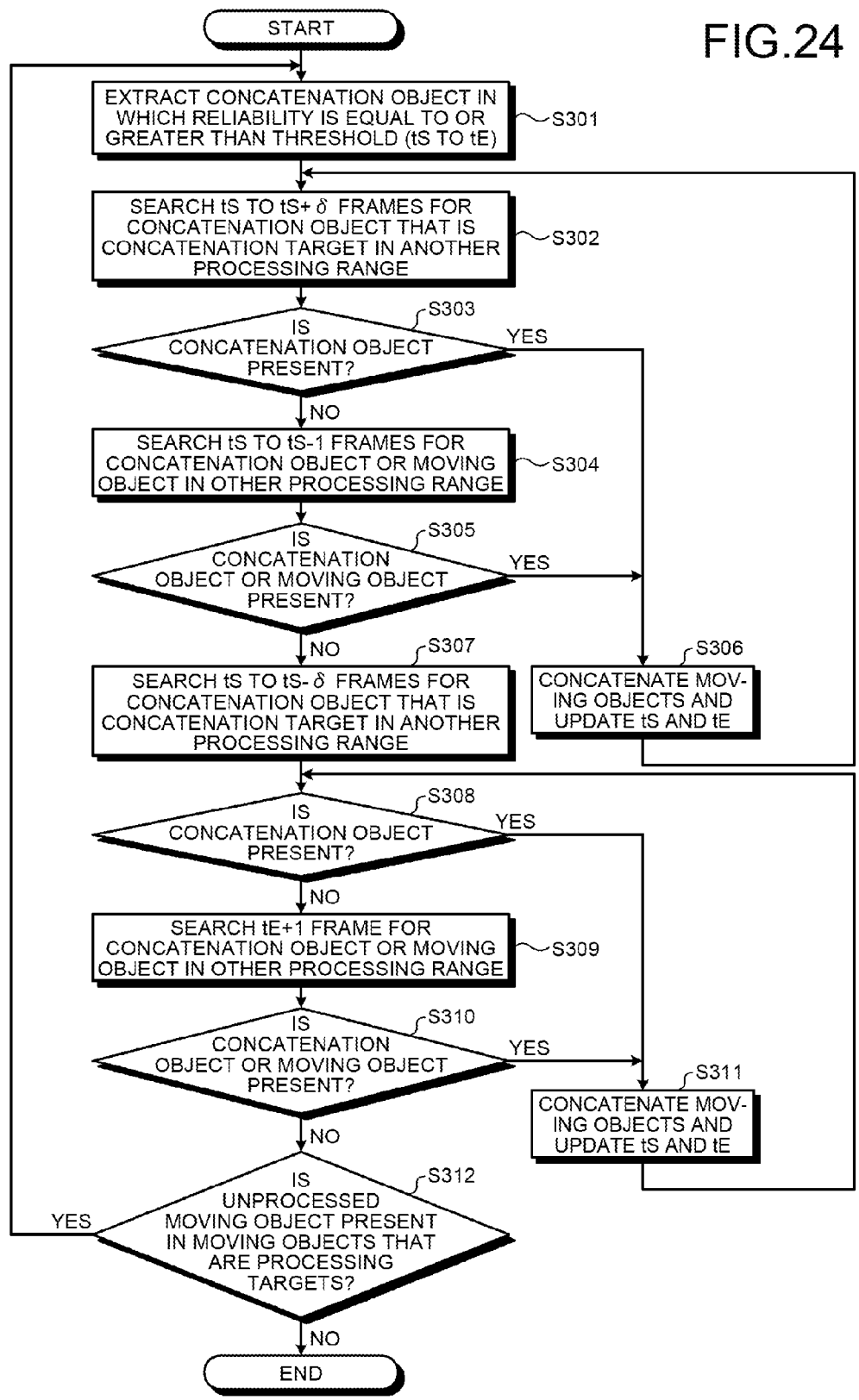
FIG. 24 is a flowchart illustrating the flow of an integration process.

In the following, a description will be given of the flow of the integration process indicated at Step S108. FIG. 24 is a flowchart illustrating the flow of the integration process. As illustrated in FIG. 24, the image processing apparatus 100 extracts a concatenation object in which the reliability is equal to or greater than the threshold (Step S301). At Step S301, the concatenation object indicates a combination of concatenated moving objects. The image processing apparatus 100 extracts one of the concatenation objects in which the reliability of the moving objects included in the concatenation object is equal to or greater than the threshold. At Step S301, as an example, it is assumed that the image processing apparatus 100 has extracted the concatenation objects concatenated in the tS frame to the tE frame. Here, tS represents a starting frame of the concatenation object and tE represents an end frame of the concatenation object.

The image processing apparatus 100 searches the tS to tS+ frames for a concatenation object that is the concatenation target in another processing range (Step S302). If, at Step S302, the detection source of the concatenation objects selected at previous Step S301 is the front region F, the other processing range corresponds to the side region S or the crossing region C. If the detection source of the concatenation objects selected at previous Step S301 is the side region S, the other processing range corresponds to the front region F or the crossing region C. If the detection source of the concatenation objects selected at previous Step S301 is the crossing region C, the other processing range corresponds to the front region F or the side region S.

The image processing apparatus 100 determines whether a concatenation object is present (Step S303). If a concatenation object is present (Yes at Step S303), the image processing apparatus 100 proceeds to Step S306.

In contrast, if a concatenation object is not present (No at Step S303), the image processing apparatus 100 determines whether a concatenation object or a moving object is present in the tS−1 frame in the other processing range (Step S304). If a concatenation object or a moving object is present (Yes at Step S305), the image processing apparatus 100 proceeds to Step S306. In contrast, if a concatenation object or a moving object is not present (No at Step S305), the image processing apparatus 100 proceeds to Step S307.

The image processing apparatus 100 concatenates moving objects and updates tS and tE (Step S306). For example, if the moving objects in each of the frames in the time period T1 illustrated in FIG. 15 are concatenated with the moving objects in each of the frames in the time period T3, the image processing apparatus 100 updates the tS frame to the starting frame in the time period T1 and updates the tE frame to the end frame in the time period T3. The image processing apparatus 100 performs the process at Step S306 and then proceeds to Step S302.

Furthermore, the image processing apparatus 100 searches the tS to tS−δ frames for a concatenation object that corresponds to the concatenation target in another processing range (Step S307). The image processing apparatus 100 determines whether a concatenation object is present (Step S308).

If a concatenation object is present (Yes at Step S308), the image processing apparatus 100 proceeds to Step S311. In contrast, if a concatenation object is not present (No at Step S308), the image processing apparatus 100 searches the tE+1 frame in order to determine whether a concatenation object or a moving object is present in another processing range (Step S309).

The image processing apparatus 100 determines whether a concatenation object or a moving object is present (Step S310). If a concatenation object is present (Yes at Step S310), the image processing apparatus 100 concatenates the moving objects, updates tS and tE (Step S311), and proceeds to Step S308.

If a concatenation object is not present (No at Step S310), the image processing apparatus 100 determines whether an unprocessed moving object is present from among the moving objects that are the processing target (Step S312). If an unprocessed moving object is present from among the moving objects that are the processing target (Yes at Step S312), the image processing apparatus 100 proceeds to Step S301. In contrast, an unprocessed moving object is not present from among the moving objects that are the processing target (No at Step S312), the image processing apparatus 100 ends the integration process.

In the following, a description will be given of the effect of the image processing apparatus 100 according to the second embodiment. For example, when the image processing apparatus 100 performs a process on image data recorded in a drive recorder, most of the images included in the processing target region are road surfaces. If a moving object is present on the road surface, a luminance difference occurs between the image of the moving object and the image of the road surface. Consequently, for example, by detecting an image region in which the additional values of the luminance values for each coordinate in the x-axis direction are equal, the moving object can be accurately detected.

Furthermore, as described with reference to FIG. 10, for the luminance projection value in the vertical direction, if the range in which the additional values of the luminance values are equal comes into contact with outside the side region S, the image processing apparatus 100 excludes the subject range from the range that includes the moving object. For example, if a counterpart vehicle is present in the side region S, the vehicle often does not appear in the location in which the region of the detected moving object comes into contact with the circumscribed point of the side region S. Consequently, by performing the process described above, it is possible to prevent a state in which noise is erroneously detected as a moving object.

Furthermore, the image processing apparatus 100 sets the front region F, the side region S, and the crossing region C and the front detecting unit 152a, the side detecting unit 152b, and the crossing detecting unit 152c detect a moving object for each region. Then, the image processing apparatus 100 determines a time variation and a variation in coordinates of the moving object detected in each of the regions F, S, and C. Consequently, the image processing apparatus 100 detects candidates for multiple moving objects from the front region F, the side region S, and the crossing region C; determines afterwards whether the detected objects are the same moving object; and determines the movement of the moving object. For example, there may be a case in which the moving object that was not able to be detected in the front region F and the side region S can be detected in the crossing region C; therefore, a moving object can be continuously detected from each of the regions F, S, and C.

Furthermore, the image processing apparatus 100 specifies the moving object in which the reliability is the maximum, uses the specified moving object in which the reliability is the maximum as the origin, and concatenates the moving objects in each frame. In general, the reliability of the moving object detected in the front region F is sometimes the maximum. Consequently, it is possible to specify a moving object in the front region F and specify a moving object in the crossing region C and specify a moving object that overlaps with the specified moving object in the front region F. Furthermore, it is possible to specify a moving object in the side region S that overlaps with the specified moving object in the crossing region C. Consequently, it is possible to accurately trace the movement of the moving object from the side region S to the front region F and evaluates that, for example, the cause of a near miss as a rush out into a street.

Furthermore, the image processing apparatus 100 adjusts the size of the crossing region depending on whether the own vehicle is stopped. For example, as described in FIG. 8, if the speed is not zero, the crossing region C is obtained. If the speed is zero, the crossing region Ca that is greater than the crossing region C is obtained. If the crossing detecting unit 152c attempts to detect a moving object by using a difference process when the own vehicle has a certain speed, a fixed object is detected as a difference and thus an amount of noise becomes great. Consequently, if the own vehicle has a certain speed, by making the crossing region narrow, an amount of detected noise can be reduced.

The process performed by the image processing apparatus 100 described in the second embodiment is only an example and another process may also be performed. In the following, a description will be given of another process performed by the image processing apparatus 100.

Another process performed by the side detecting unit 152b will be described. For example, when the side detecting unit 152b detects a moving object from the side region S, the side detecting unit 152b may also detect a moving object by sequentially performing a night determination process, a high luminance region detection process, and a moving object detection process.

the night determination process performed by the side detecting unit 152b will be described. The side detecting unit 152b refers to the drive recorder information and calculates the average luminance for the predetermined region of image data. For example, the side detecting unit 152b sets a region above a vanishing point and calculates the average luminance. If the average luminance is less than a predetermined luminance, the side detecting unit 152b determines that the subject image data is night image data. The side detecting unit 152b performs the same process on the image data in each frame and extracts, from the drive recorder information 141, each frame that includes the night image data. Furthermore, the side detecting unit 152b may also determine the night image data by using the date and time.

The high luminance region detection process performed by the side detecting unit 152b will be described. In the side region S of the night image data, the side detecting unit 152b detects a high luminance region with a predetermined luminance or more. If the area of the high luminance region is greater than the predetermined area, the side detecting unit 152b detects the high luminance region as a moving object candidate. The side detecting unit 152b performs the same process on each of the pieces of the night image data and detects a moving object candidate region from each of the pieces of image data.

The moving object detection process performed by the side detecting unit 152b will be describe. The side detecting unit 152b concatenates the moving object candidate regions detected from each of the pieces of the image data. For example, the side detecting unit 152b compares the moving object candidate regions detected from the previous and the subsequent image data and concatenates each of the moving object candidate regions if the size of the overlapped region is greater than the threshold.

On the basis of the coordinates of each of the concatenated moving object candidate regions and the camera parameter 145, the side detecting unit 152b calculates a variation in the distance of the moving object candidate region in the x direction and calculates a variation in the distance in the y direction. For example, the side detecting unit 152b calculates, on the basis of the Equation (3) and the Equation (5) described above, a variation in the distance of the moving object candidate region in the x direction and a variation in the distance in the y direction.

If the distance in the x direction varies in the negative direction or if the distance in the y direction varies in the positive direction, the side detecting unit 152b detects the moving object candidate region as a moving object. In contrast, it is conceivable that a moving object candidate simply increased in the x direction or simply decreased in the y direction is a static object. Consequently, the side detecting unit 152b does not detect, as a moving object, a moving object candidate that is simply increased in the x direction or that is simply decreased in the y direction.

Figure 25:
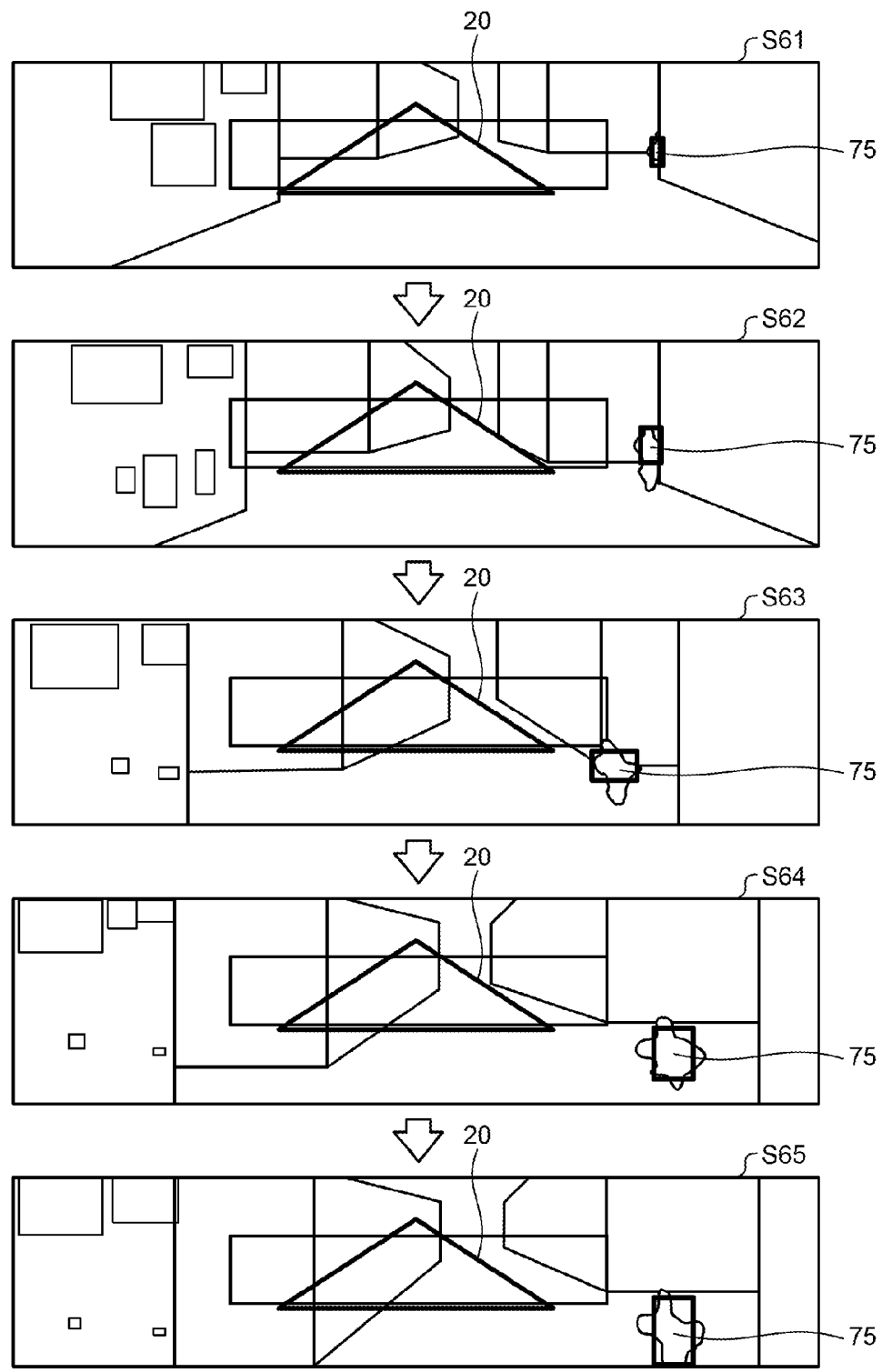
FIG. 25 is a schematic diagram illustrating another process performed by a side detecting unit.

FIG. 25 is a schematic diagram illustrating another process performed by a side detecting unit. As illustrated in FIG. 25, at Steps S61, S62, S63, S64, and S65, moving object candidate regions 75 are detected. It is assumed that each of the moving object candidate regions 75 have already been concatenated in each frame. In the example illustrated in FIG. 25, the moving object candidate regions 75 approach the own vehicle and the distance in the x direction varies in the negative direction. In such a case, the side detecting unit 152b detects the moving object candidate regions 75 as moving objects.

In this way, by detecting a moving object from a lump of a high luminance region and the movement of the lump of the high luminance region, the side detecting unit 152b can accurately detect a moving object even if the image quality of the image data is coarse.

A description will be given of another process performed by the reliability calculating unit 153. The reliability calculating unit 153 may also calculate the reliability of the moving object detected by the front detecting unit 152a or the side detecting unit 152b on the basis of the difference between the luminance value of the moving object and the predetermined luminance value. For example, the reliability calculating unit 153 calculates the absolute value of the difference between the average luminance of the luminance projection value 30a described in FIG. 9 and the luminance value of the moving object. The reliability calculating unit 153 normalizes the absolute value of the difference by making the reliability approach 100 as the absolute value of the difference moves away from zero and by making the reliability approaches zero as the absolute value of the difference approaches zero and calculates the normalized value as the reliability.

For example, if a vehicle is present in front of the own lane, there ought to be a difference between the added luminance values obtained from both ends of the front region F and obtained from the center. By using this characteristic, it is possible to increase the reliability when a vehicle that is present in the front region F is detected.

For example, in a case in which a T-shaped intersection that is present in the front region F is erroneously detected as a moving object, there is no difference in the added luminance values between the both ends of the front region F and the center. If this characteristic is used, it is possible to reduce the reliability of the erroneously detected moving object.

Furthermore, the reliability calculating unit 153 may also calculate, on the basis of the coordinates of the moving object, the reliability of the moving object detected by the front detecting unit 152a or the side detecting unit 152b. For example, the distance between the coordinates of the moving object detected from the front region F and the predetermined coordinates in the front region F is calculated. For example, the predetermined coordinates is defined as the center coordinates in the front region F. The reliability calculating unit 153 performs normalization by making the reliability approach 100 as the distance approaches zero and by making the reliability approach zero as the distance moves away from zero and then calculates the normalized value as the reliability. By performing this process, if noise that may possibly be detected at the corner of the front region or the side region as the moving object, it is possible to set the reliability of the subject moving object to low.

Another process performed by the classifying unit 156 and the evaluating unit 157 will be described. The classifying unit 156 classifies the movement of the detected moving object into the "front", the "crossing", and the "side"; however, if the movement of the moving object does not match any one of the conditions of the "front", the "crossing", and the "side", the moving object may also be classified into "not available". If the moving object is classified into "not available", the evaluating unit 157 evaluates that the subject moving object is not the cause of a near miss.

Furthermore, if the moving object is classified into the "side" or the "crossing", the evaluating unit 157 may also record, in map data, the detection position of the subject moving object as the occurrence location of a near miss. Furthermore, the evaluating unit 157 may also associate the occurrence location of the near miss with the time, the weather, the season, or the like and records them in map data. If the moving object is classified into the "side" or the "crossing", this state indicates a near miss that does not depend on a person and that is specific to the location.

In addition to the processing unit illustrated in FIG. 2, an excluding unit may also be included in the image processing apparatus 100. For example, the excluding unit deletes, on the basis of the reliability in the moving object management table 142, the record in which the reliability is less than a predetermined reliability from the moving object management table 142. Alternatively, the excluding unit may also record a record by attaching an exclusion flag to the record in which the reliability is less than a predetermined reliability such that the record can be distinguished from the other records. By installing the excluding unit, it is possible to exclude a moving object that may possibly be noise.

The front detecting unit 152a and the side detecting unit 152b described above are examples of a calculating unit and a detecting unit, respectively. The crossing detecting unit 152c described above is an example of a variation region detecting unit. The reliability calculating unit 153 described above is an example of a reliability calculating unit. The concatenating unit 154 and the integrating unit 155 are examples of a determining unit and a concatenating unit, respectively.

In the following, a description will be given of an example of a computer that executes an image processing program that implements the same function as that performed by the image processing apparatus described in the above embodiment. FIG. 26 is a block diagram illustrating an example of a computer that executes an image processing program.

As illustrated in FIG. 26, a computer 300 includes a CPU 301 that executes various arithmetic processing, an input device 302 that receives an input of data from a user, and a display 303. Furthermore, the computer 300 includes a reading device 304 that reads a program of the like from a storage medium and an interface device 305 that exchanges data with another computer via a network. Furthermore, the computer 300 includes a RAM 306 and a hard disk device 307 that temporarily store therein various kinds of information. Then, each of the devices 301 to 307 is connected to a bus 308.

The hard disk device 307 includes, for example, a calculating program 307a, a detection program 307b, a variation region detection program 307c, a reliability calculating program 307d, a concatenation program 307e, a determining program 307f, and an exclusion program 307g. The CPU 301 reads each of the programs 307a to 307g and loads the programs in the RAM 306.

The calculating program 307a functions as a calculating process 306a. The detection program 307b functions as a detection process 306b. The variation region detection program 307c functions as a variation region detection process 306c. The reliability calculating program 307d functions as a reliability calculating process 306d. The concatenation program 307e functions as a concatenation process 306e. The determining program 307f functions as a determining process 306f. An exclusion program 307g functions as an exclusion process 306g.

For example, the calculating process 306a and the detection process 306b correspond to the front detecting unit 152a, the side detecting unit 152b, respectively, and the like. The variation region detection process 306c corresponds to the crossing detecting unit 152c or the like. The reliability calculating process 306d corresponds to the reliability calculating unit 153 or the like. The concatenation process 306e corresponds to the concatenating unit 154, the integrating unit 155, or the like. The determining process 306f corresponds to the concatenating unit 154, the integrating unit 155, or the like. The exclusion process 306g corresponds to the excluding unit or the like described above.

Furthermore, each of the programs 307a to 307g does not need to be stored in the hard disk device 307 in advance from the beginning. For example, each of the programs is stored in a "portable physical medium", such as a flexible disk (FD), a CD-ROM, a DVD disk, a magneto-optic disk, an IC CARD, or the like that is to be inserted into the computer 300. Then, the computer 300 may also read and execute each of the programs 307a to 307g from the portable physical medium.

According to one embodiment of the present invention, it is possible to provide an advantage in that it is possible to correctly detect a subject to be detected.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus comprising a processor that executes a process comprising:
    acquiring an image from a memory;
    summing a plurality of luminance values of a coordinate value in a direction included in a processing target region in the image to generate a first additional value of the luminance values for each coordinate value in the direction;
    detecting a first region of the image in which each of the first additional values is larger than a reference value based on a result;
    excluding a subject range from the first region when the subject range contacts with a predetermined side region, wherein the subject range is a range in which an additional values of the luminance values are equal;
    creating a difference image between multiple frames by using, as targets, another processing target region in which part of the region overlaps with the processing target region in the image;
    detecting a second region that varies depending on the difference image;
    determining, on the basis of the first region and the second region, a time variation and a variation in coordinates of the first region and the second region; and
    displaying the time variation and the variation in coordinates of the first region and the second region, using a display.

2. The image processing apparatus according to claim 1, wherein the summing further sums a plurality of luminance values of a coordinate value in an another direction which is different from the direction, the another direction being included in the processing target region in the image to generate a second additional value of the luminance values for each coordinate value in the another direction, and the detecting further detects a region of the image in which each of the second additional values is larger than the reference value based on a result.

3. The image processing apparatus according to claim 1, wherein the process further comprises:

calculating the reliability of the first region on the basis of the size of the first region or on the basis of the coordinates or a luminance difference between inside and outside the first region; and excluding the first region on the basis of the reliability calculated by the calculating.

4. The image processing apparatus according to claim 1, wherein the process further comprises a specifying, on the basis of the reliability of a region detected from the processing target region or a region detected from the other processing target region, a region in which the reliability is the maximum and a concatenating the specified region in which the reliability is the maximum, which is used as the origin, with the first region detected in each of the frames or with the second region detected in each of the frames.

5. The image processing apparatus according to claim 1, wherein the detecting adjusts the range of the other processing target region on the basis of a speed at the time of image capturing.

6. A non-transitory computer-readable recording medium having stored therein an image processing program that causes a computer to execute a process comprising:

acquiring an image from a memory;

summing a plurality of luminance values of a coordinate value in a direction included in a processing target region in the image to generate an additional value of the luminance values for each coordinate value in the direction;

detecting a first region of the image in which each of the additional values is larger than a reference value based on a result;

excluding a subject range from the first region when the subject range contacts with a predetermined side region, wherein the subject range is a range in which an additional values of the luminance values are equal;

creating a difference image between multiple frames by using, as targets, another processing target region in which part of the region overlaps with the processing target region in the image;

detecting a second region that varies depending on the difference image;

determining, on the basis of the first region and the second region, a time variation and a variation in coordinates of the first region and the second region; and displaying the time variation and the variation in coordinates of the first region and the second region, using a display.

7. An image processing method executed by a computer, the image processing method comprising:

acquiring an image from a memory;

summing a plurality of luminance values of a coordinate value in a direction included in a processing target region in an image to generate an additional value of the luminance values for each coordinate value in the direction;

detecting a first region of the image in which each of the additional values is larger than a reference value based on a result;

excluding a subject range from the first region when the subject range contacts with a predetermined side region, wherein the subject range is a range in which an additional values of the luminance values are equal;

creating a difference image between multiple frames by using, as targets, another processing target region in which part of the region overlaps with the processing target region in the image;

detecting a second region that varies depending on the difference image;

determining, on the basis of the first region and the second region, a time variation and a variation in coordinates of the first region and the second region; and displaying the time variation and the variation in coordinates of the first region and the second region, using a display.

* * * * *